United States Patent
Rico Alvarino et al.

(10) Patent No.: US 11,109,295 B2
(45) Date of Patent: Aug. 31, 2021

(54) INTERACTION OF PHYSICAL CHANNEL CHANGES WITH PHYSICAL CHANNEL BASED CELL MEASUREMENTS

(71) Applicant: QUALCOMM Incorporated, San Diego, CA (US)

(72) Inventors: Alberto Rico Alvarino, San Diego, CA (US); Mungal Singh Dhanda, Slough (GB); Le Liu, Fremont, CA (US); Umesh Phuyal, San Diego, CA (US); Tae Min Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 16/416,246

(22) Filed: May 19, 2019

(65) Prior Publication Data

US 2019/0357107 A1  Nov. 21, 2019

Related U.S. Application Data

(60) Provisional application No. 62/674,509, filed on May 21, 2018.

(51) Int. Cl.
*H04W 36/30* (2009.01)
*H04W 36/08* (2009.01)
*H04W 36/00* (2009.01)

(52) U.S. Cl.
CPC ....... *H04W 36/30* (2013.01); *H04W 36/0058* (2018.08); *H04W 36/08* (2013.01)

(58) Field of Classification Search
CPC . H04W 36/30; H04W 36/0058; H04W 24/10; H04W 36/08; H04W 4/70; H04W 48/12; H04W 48/16; H04L 5/0048
See application file for complete search history.

(56) References Cited

U.S. PATENT DOCUMENTS

2012/0072802 A1* 3/2012 Chinnici .......... H04L 1/20
714/758
2013/0130751 A1* 5/2013 Vummintala .......... H03D 7/16
455/574

(Continued)

FOREIGN PATENT DOCUMENTS

CN  101998660 A  *  3/2011

OTHER PUBLICATIONS

Ericsson: "Measurement Accuracy Enhancements", 3GPP Draft; R2-1807764, 3rd Generation Partnership Project (3GPP), Mobile Competence Centre ; 650, Route Des Lucioles ; F-06921 Sophia-Antipolis Cedex; France, vol. RAN WG2, No. Busan, South Korea; May 21, 2018-May 25, 2018, May 20, 2018 (May 20, 2018), XP051444107, 6 Pages, Retrieved from the Internet: URL:http://www.3gpp.org/ftp/Meetings%5F3GPP%5FSYNC/RAN2/Docs/ [retrieved on May 20, 2018].

(Continued)

*Primary Examiner* — Zhensheng Zhang
(74) *Attorney, Agent, or Firm* — Holland & Hart LLP; Nerrie M. Zohn

(57) ABSTRACT

Methods, systems, and devices for wireless communications are described. A user equipment (UE) may measure a physical channel such as a narrowband physical broadcast channel (NPBCH) to supplement (e.g., or as an alternative to) reference signal measurements when determining a received signal measurement, such as a received signal strength or received signal quality of a cell. A base station may transmit an indication to a UE that identifies the frequency at which a portion of NPBCH transmissions (e.g., reserved fields of a master information block (MIB)) is expected to change from one NPBCH transmission to another. The UE may adjust its utilization of NPBCH for determining the received signal measurement based on the indication. Further, the UE may communicate with the cell (Continued)

based on the determination of the received signal measurement, which are based on the indication.

30 Claims, 14 Drawing Sheets

(56) References Cited

U.S. PATENT DOCUMENTS

| | | | | |
|---|---|---|---|---|
| 2014/0301296 A1* | 10/2014 | Vos | ............... | H04L 1/00 370/329 |
| 2017/0279579 A1* | 9/2017 | Qian | ............... | H04W 72/0406 |
| 2018/0115401 A1* | 4/2018 | Cedergren | ............... | H04L 5/0048 |
| 2019/0068303 A1* | 2/2019 | Gao | ............... | H04B 7/0697 |
| 2019/0239123 A1* | 8/2019 | Kim | ............... | H04W 72/0453 |

OTHER PUBLICATIONS

International Search Report and Written Opinion—PCT/US2019/033157—ISA/EPO—dated Jul. 17, 2019.

Qualcomm Incorporated: "Improvement of PHY Measurements", 3GPP Draft; R1-1807120 Improvement of PHY Measurements, 3rd Generation Partnership Project (3GPP), Mobile Competence Centre, 650, Route Des Lucioles ; F-06921 Sophia-Antipolis Cedex ; France, vol. RAN WG1, No. Busan, Korea; May 21, 2018-May 25, 2018, May 20, 2018 (May 20, 2018), XP051442318, 1 Page, Retrieved from the Internet: URL:http://www.3gpp.org/ftp/Meetings%5F3GPP%5FSYNC/RAN1/Docs/ [retrieved on May 20, 2018].

Qualcomm Incorporated: "NPBCH-Based RRM Measurement", 3GPP Draft; R4-1804419 NPBCH-Based RRM Measurement V3, 3rd Generation Partnership Project (3GPP), Mobile Competence Centre ;650, Route Des Lucioles ; F-06921 Sophia-Antipolis Cedex ; France, vol. RAN WG4, No. Melbourne, Australia; Apr. 16, 2018-Apr. 20, 2018, Apr. 15, 2018 (Apr. 15, 2018), XP051431291, 5 Pages, Retrieved from the Internet: URL:http://www.3gpp.org/ftp/Meetings%5F3GPP%5FSYNC/RAN4/Docs/ [retrieved on Apr. 15, 2018].

* cited by examiner

INTERACTION OF PHYSICAL CHANNEL CHANGES WITH PHYSICAL CHANNEL BASED CELL MEASUREMENTS

CROSS REFERENCES

The present application for patent claims the benefit of U.S. Provisional Patent Application No. 62/674,509 by RICO ALVARINO et al., entitled "INTERACTION OF PHYSICAL CHANNEL CHANGES WITH PHYSICAL CHANNEL BASED CELL MEASUREMENTS," filed May 21, 2018, assigned to the assignee hereof, and expressly incorporated by reference herein in its entirety.

BACKGROUND

The following relates generally to wireless communications, and more specifically to interaction of physical channel changes with physical channel based cell measurements.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-s-OFDM). A wireless multiple-access communications system may include a number of base stations or network access nodes, each simultaneously supporting communication for multiple communications devices, which may be otherwise known as user equipment (UE).

SUMMARY

The described techniques relate to improved methods, systems, devices, and apparatuses that support interaction of physical channel changes with physical channel based cell measurements. Generally, the described techniques provide for utilizing an indication of an expected frequency of change at a physical channel to adjust the use of the physical channel for cell measurement procedures.

In some cases, a user equipment (UE) may measure signals received from serving or nearby cells (e.g., base stations) for various reasons including for cell reselection, power control, or channel state information reporting. The base stations may transmit reference signals (e.g., cell reference signals) having a known signal or sequence over predetermined resources for the purposes of channel measurement and reporting. However, reference signals may be transmitted sparsely over resources of physical channels of the cell. For example, reference signals for narrow-band channels (e.g., narrow-band Internet of Things (NB-IoT)) may use only a small number (e.g., 4, 8, 16, etc.) of resource elements of each subframe or transmission time interval (TTI). Thus, performing accurate cell measurements may require a long measurement time in order to build up an accurate channel estimation from the sparse reference signals. For example, a UE may correlate the known reference signal over a long number of subframes (e.g., 10, 20, 40, etc.) in order to determine an accurate cell measurement for use in cell reselection, power control, or channel state information reporting. Therefore, improved techniques for channel estimation are desired.

According to the techniques described herein, a UE may measure a physical channel such as a narrowband physical broadcast channel (NPBCH) to supplement (e.g., or as an alternative to) reference signal measurements when determining a received signal measurement, such as a received signal strength or received signal quality of a cell. Using a physical channel may allow the UE to accurately estimate the channel faster than measuring only reference signals because there may be more dense resources used for the physical channel. According to various aspects, techniques for supporting the use of a physical channel for cell measurements include indications of frequency of change of portions of the physical channel. For example, a base station may transmit an indication to a UE that identifies the frequency at which a portion of NPBCH transmissions (e.g., reserved fields of a master information block (MIB)) is expected to change from one NPBCH transmission to another. The UE may adjust its utilization of NPBCH for determining the received signal measurement based on the indication. Further, the UE may communicate with the cell based on the determination of the received signal measurement (e.g., the received signal strength measurement or the received signal quality measurement).

A method of wireless communication is described. The method may include receiving an indication of a frequency of change of a portion of a physical channel associated with a cell, determining a received signal measurement for the cell based on one of a cell reference signal associated with the cell or a combination of the cell reference signal, an estimated physical channel transmission, and a received physical channel transmission, where the determining is based on the indication of the frequency of change, and communicating with the cell based on the determined received signal measurement.

An apparatus for wireless communication is described. The apparatus may include a processor, memory coupled with the processor, and instructions stored in the memory. The instructions may be executable by the processor to cause the apparatus to receive an indication of a frequency of change of a portion of a physical channel associated with a cell, determine a received signal measurement for the cell based on one of a cell reference signal associated with the cell or a combination of the cell reference signal, an estimated physical channel transmission, and a received physical channel transmission, where the determining is based on the indication of the frequency of change, and communicate with the cell based on the determined received signal measurement.

Another apparatus for wireless communication is described. The apparatus may include means for receiving an indication of a frequency of change of a portion of a physical channel associated with a cell, determining a received signal measurement for the cell based on one of a cell reference signal associated with the cell or a combination of the cell reference signal, an estimated physical channel transmission, and a received physical channel transmission, where the determining is based on the indication of the frequency of change, and communicating with the cell based on the determined received signal measurement.

A non-transitory computer-readable medium storing code for wireless communication is described. The code may include instructions executable by a processor to receive an indication of a frequency of change of a portion of a physical channel associated with a cell, determine a received signal measurement for the cell based on one of a cell reference signal associated with the cell or a combination of the cell reference signal, an estimated physical channel transmission, and a received physical channel transmission, where the determining is based on the indication of the frequency of change, and communicate with the cell based on the determined received signal measurement.

In some examples of the method, apparatuses, and non-transitory computer-readable medium described herein, the received signal measurement includes at least one of a received signal strength measurement or a received signal quality measurement. In some examples of the method, apparatuses, and non-transitory computer-readable medium described herein, the indication includes a set of indicators and the portion of the physical channel includes a set of fields, and where each of the set of indicators may be associated with one or more of the set of fields.

In some examples of the method, apparatuses, and non-transitory computer-readable medium described herein, the determining the received signal measurement may include operations, features, means, or instructions for decoding a first received sequence for the physical channel, generating a set of estimated physical channel transmissions for the physical channel based on the indication and the decoded first received sequence, and correlating the set of estimated physical channel transmissions to a second received physical channel transmission.

In some examples of the method, apparatuses, and non-transitory computer-readable medium described herein, the receiving the indication includes receiving the indication over the physical channel of the cell, a second physical channel of the cell, a control channel of the cell, a configuration message for the cell, a third physical channel of a second cell, a control channel of the second cell, or a configuration message for the second cell.

In some examples of the method, apparatuses, and non-transitory computer-readable medium described herein, the indication indicates one of a first change periodicity associated with the frequency of change of the portion of the physical channel not satisfying a threshold and a second change periodicity associated with the frequency of change of the portion of the physical channel satisfying the threshold. In some examples of the method, apparatuses, and non-transitory computer-readable medium described herein, the threshold may be associated with no change for the portion of the physical channel.

Some examples of the method, apparatuses, and non-transitory computer-readable medium described herein may further include operations, features, means, or instructions for based on the indicated frequency of change of the portion of the physical channel, the determining the received signal measurement may be based exclusively on measurements of the cell reference signal.

In some examples of the method, apparatuses, and non-transitory computer-readable medium described herein, the determining the received signal measurement may include operations, features, means, or instructions for decoding a received sequence for the physical channel, generating the estimated physical channel transmission based on the decoded received sequence, and determining a correlation of the estimated physical channel transmission to a second received physical channel transmission. In some examples of the method, apparatuses, and non-transitory computer-readable medium described herein, the decoding may include operations, features, means, or instructions for determining, based on the indication, a likelihood that a set of sequences associated with a set of received physical channel transmissions may have no change for the portion of the physical channel, and soft-combining the set of received physical channel transmissions. In some examples of the method, apparatuses, and non-transitory computer-readable medium described herein, the determining the received signal measurement may include operations, features, means, or instructions for determining that the correlation of the estimated physical channel transmission to the second received physical channel transmission may be below a threshold, and determining, based on the determining that the correlation may be below the threshold, the received signal measurement based exclusively on measurements of the cell reference signal.

In some examples of the method, apparatuses, and non-transitory computer-readable medium described herein, the communicating with the cell may include operations, features, means, or instructions for performing cell reselection to the cell based on the received signal measurement. In some examples of the method, apparatuses, and non-transitory computer-readable medium described herein, the communicating with the cell may include operations, features, means, or instructions for transmitting an uplink transmission, where an uplink power for the uplink transmission may be based on the received signal measurement. In some examples of the method, apparatuses, and non-transitory computer-readable medium described herein, the communicating with the cell may include operations, features, means, or instructions for reporting channel quality to a base station, where the reported channel quality may be based on the received signal measurement.

In some examples of the method, apparatuses, and non-transitory computer-readable medium described herein, the portion of the physical channel includes a reserved field of the physical channel. In some examples of the method, apparatuses, and non-transitory computer-readable medium described herein, the physical channel includes a physical broadcast channel (PBCH).

A method of wireless communication is described. The method may include determining a frequency of change for a portion of a physical channel associated with a cell, transmitting a cell reference signal associated with the cell, a physical channel, and an indication of the frequency of change for the portion of the physical channel, and communicating with a UE based on the transmitted indication.

An apparatus for wireless communication is described. The apparatus may include a processor, memory coupled with the processor, and instructions stored in the memory. The instructions may be executable by the processor to cause the apparatus to determine a frequency of change for a portion of a physical channel associated with a cell, transmit a cell reference signal associated with the cell, a physical channel, and an indication of the frequency of change for the portion of the physical channel, and communicate with a UE based on the transmitted indication.

Another apparatus for wireless communication is described. The apparatus may include means for determining a frequency of change for a portion of a physical channel associated with a cell, transmitting a cell reference signal associated with the cell, a physical channel, and an indication of the frequency of change for the portion of the physical channel, and communicating with a UE based on the transmitted indication.

A non-transitory computer-readable medium storing code for wireless communication is described. The code may include instructions executable by a processor to determine a frequency of change for a portion of a physical channel associated with a cell, transmit a cell reference signal associated with the cell, a physical channel, and an indication of the frequency of change for the portion of the physical channel, and communicate with a UE based on the transmitted indication. In some examples of the method, apparatuses, and non-transitory computer-readable medium described herein, the indication includes a set of indicators and the portion of the physical channel includes a set of fields, and where each of the set of indicators may be associated with one or more of the set of fields.

In some examples of the method, apparatuses, and non-transitory computer-readable medium described herein, the transmitting the indication includes transmitting the indication over the physical channel of the cell, a second physical channel of the cell, a control channel of the cell, or a configuration message for the cell. Some examples of the method, apparatuses, and non-transitory computer-readable medium described herein may further include operations, features, means, or instructions for transmitting a second indication of a frequency of change for a second portion of a second physical channel of a second cell, the transmitting the second indication being over the physical channel, a third physical channel of the cell, a control channel of the cell, or a configuration message.

In some examples of the method, apparatuses, and non-transitory computer-readable medium described herein, the indication indicates one of a first change periodicity associated with the frequency of change of the portion of the physical channel not satisfying a threshold and a second change periodicity associated with the frequency of change of the portion of the physical channel satisfying the threshold.

In some examples of the method, apparatuses, and non-transitory computer-readable medium described herein, the communicating may include operations, features, means, or instructions for receiving a random access message from the UE, where the UE performs cell reselection to the cell based on a measurement of the physical channel, and where the measurement of the physical channel may be based on the indication. In some examples of the method, apparatuses, and non-transitory computer-readable medium described herein, the communicating may include operations, features, means, or instructions for receiving an uplink transmission, where an uplink power for the uplink transmission may be based on a measurement of the physical channel, and where the measurement of the physical channel may be based on the indication. In some examples of the method, apparatuses, and non-transitory computer-readable medium described herein, the communicating may include operations, features, means, or instructions for receiving a channel quality indicator from the UE, where the channel quality indicator may be based on a measurement of the physical channel, and where the measurement of the physical channel may be based on the indication.

In some examples of the method, apparatuses, and non-transitory computer-readable medium described herein, the cell serves a first set of UEs for which the portion of the physical channel may be reserved and a second set of UEs for which the portion of the physical channel includes at least one or more fields including information for the cell.

DETAILED DESCRIPTION

Figure 1:
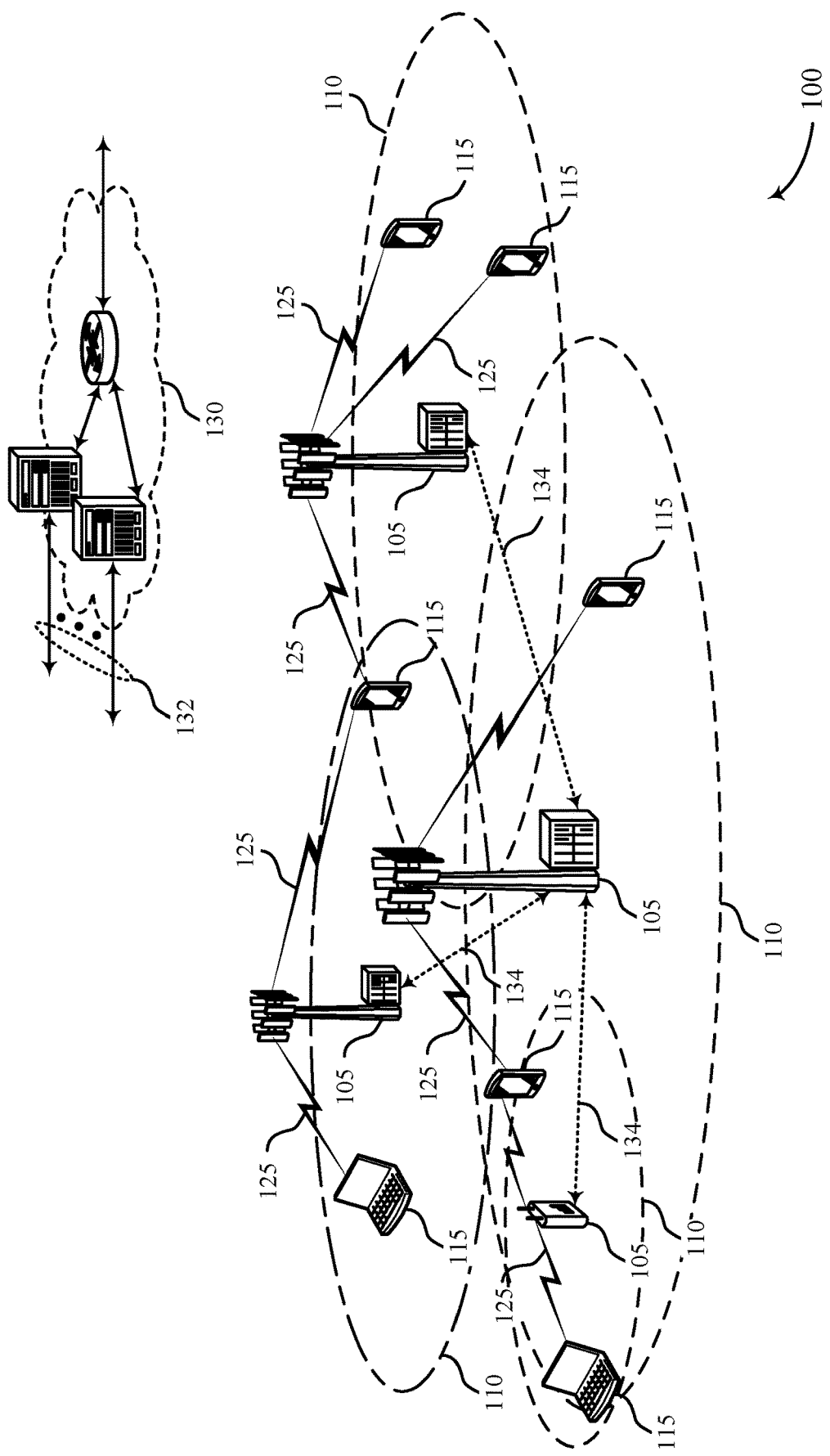
FIGS. 1 and 2 illustrate examples of wireless communications systems that support interaction of physical channel changes with physical channel based cell measurements in accordance with aspects of the present disclosure.

The described techniques relate to interaction of physical channel changes with physical channel based cell measurements. Generally, a base station may transmit an indication to a user equipment (UE) that identifies the frequency at which a portion of a physical channel is expected to change from one instance of the physical channel to another, and the UE may adjust its utilization of the physical channel for received signal measurements, such as received signal strength or received signal quality measurements of a cell based on the indication. In some wireless communications systems, a UE may measure a physical channel such as a narrowband physical broadcast channel (NPBCH) to supplement (e.g., or as an alternative to) reference signal measurements when determining the received signal strength or received signal quality of a cell. The UE may decode a first NPBCH transmission transmitted on a cell and encode the decoded fields from the first NPBCH transmission into an estimated signal. The UE may then use the estimated signal to perform channel measurements using subsequent instances of the NPBCH. For example, the UE may correlate the first estimated signal with a second NPBCH transmission on the cell that follows the first NPBCH transmission to determine the received signal strength or received signal quality of the cell. In some cases, the content of the second NPBCH transmission may be different than the content of the first NPBCH transmission, which may lead to an inaccurate determination of the received signal strength or received signal quality of the cell. For example, NPBCH transmissions may include multiple fields, where each field may change at different rates. Some fields may change frequently but with a known pattern (e.g., system frame number (SFN) information). Fields that change with a known pattern may be accounted for by a UE because a known sequence for the subsequent signal may be determined, thus allowing the type of channel estimation described above.

However, some fields may have content that is undefined or reserved at a particular version of a communications protocol (e.g., for which some UEs are provisioned or configured), such that the frequency of change of the undefined fields may be unpredictable at a UE. The variability of the frequency of change of these undefined fields may degrade the ability of UEs to employ the type of channel estimation as described above.

A base station serving the cell may transmit an indication to the UE that identifies the frequency at which a portion of NPBCH transmissions (e.g., reserved fields of a master information block (MIB)) are expected to change from one NPBCH transmission to another. The UE may adjust its utilization of NPBCH for received signal strength or received signal quality measurements based on the indication. For example, in the cases that the NPBCH transmissions are not expected to change from one NPBCH transmission to another (e.g., or change infrequently), the UE may determine to utilize NPBCH transmissions for received signal strength or received signal quality measurements, and in the cases that NPBCH transmission are expected to frequently change from one NPBCH transmission to another, the UE may determine to not utilize NPBCH transmissions for received signal strength or received signal quality measurements. The UE may then communicate with the cell based on the determination of the received signal strength measurement or the received signal quality measurement.

Aspects of the disclosure are initially described in the context of wireless communications systems. A time and frequency resource allocation and a process flow are then described. Aspects of the disclosure are further illustrated by and described with reference to apparatus diagrams, system diagrams, and flowcharts that relate to interaction of physical channel changes with physical channel based cell measurements.

FIG. 1 illustrates an example of a wireless communications system 100 that supports interaction of physical channel changes with physical channel based cell measurements in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communications or MTC may refer to data communications technologies that allow devices to communicate with one another or a base station 105 without human intervention. In some examples, M2M communications or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP)

layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by an SFN ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency-division multiplexing (OFDM), or discrete Fourier transform-spread-OFDM (DFT-s-OFDM)).

The organizational structure of the carriers may be different for different radio access technologies (e.g., LTE, LTE-A, LTE-A Pro, or NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may measure a physical channel such as NPBCH to supplement (e.g., or as an alternative to) reference signal measurements when determining the received signal strength or received signal quality of a cell. A base station 105 may transmit an indication to a UE 115 that identifies the frequency at which a portion of NPBCH transmissions (e.g., reserved fields of a MIB) is expected to change from one NPBCH transmission to another. The UE 115 may adjust its utilization of NPBCH for determining the received signal strength or received signal quality of a cell based on the indication. Further, the UE 115 may communicate with the cell based on the determination of the received signal strength measurement or the received signal quality measurement.

Figure 2:
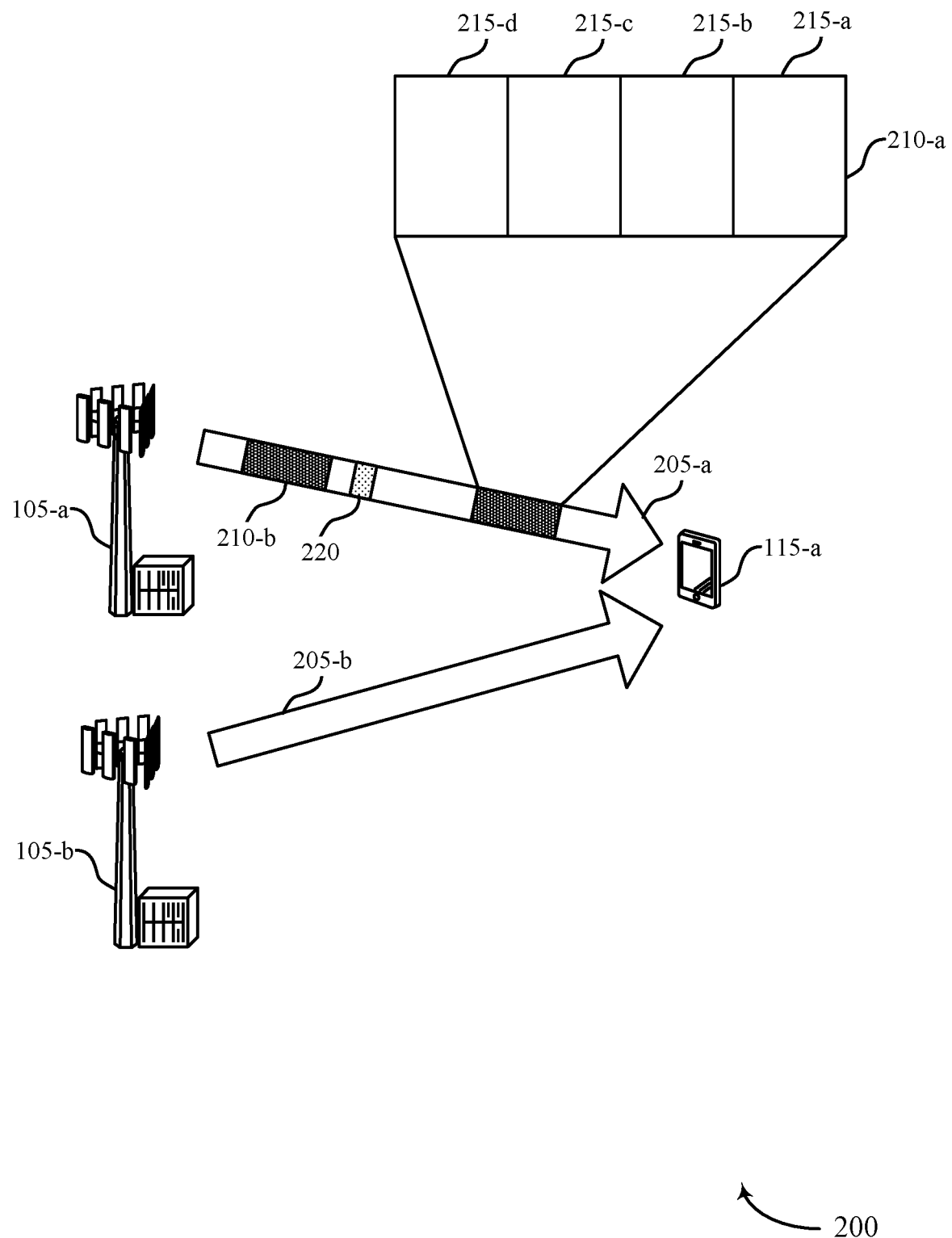

FIG. 2 illustrates an example of a wireless communications system 200 that supports interaction of physical channel changes with physical channel based cell measurements in accordance with aspects of the present disclosure. In some examples, wireless communications system 200 may implement aspects of wireless communications system 100. Wireless communications system 200 may include one or more base stations 105 which transmit NPBCH signals to a UE 115. For example, base station 105-a may transmit NPBCH 205-a to UE 115-a, and base station 105-b may transmit NPBCH 205-b to UE 115-a. NPBCH 205 may contain narrowband MIBs 210, which may include one or more fields 215.

UE 115-a may utilize NPBCH 205-a to measure a received signal measurement, such as a received signal strength or received signal quality of communications from base station 105-a for some wireless communications procedures (e.g., cell reselection procedures). Upon receiving NPBCH 205-a from base station 105-a, UE 115-a may decode NPBCH 205-a and reconstruct (e.g., encode) an estimated signal of MIB 210-a. Upon receiving MIB 210-b on NPBCH 205-a, UE 115-a may determine the received signal strength or received signal quality of communications between UE 115-a and base station 105-a based on the estimated signal generated from decoding MIB 210-a and received MIB 210-b. For example, UE 115-a may use a correlation between the estimated signal and the received MIB 210-b to determine the received signal strength or received signal quality of communications from base station 105-a.

However, the fields 215 of a MIB 210 may change in value from one MIB transmission to another (e.g., from MIB 210-a to MIB 210-b). Such changes may result in an inaccurate determination of received signal strength or received signal quality, as the estimated signal generated from decoding MIB 210-a may be different from the signal of MIB 210-b.

In some cases, UE 115-a may identify the frequency at which the fields of MIBs 210 change and may compensate for these known changes when reconstructing an estimated signal of MIB 210-a. Field 215-a may be an example of a first field, the contents of which may change regularly and in a predictable fashion. For example, field 215-a may contain SFN information and hyper SFN (HFN) information, where SFN information may increment at particular intervals (e.g., once every 10 ms, 20 ms, 40 ms, 80 ms, 160 ms, 320 ms, or 640 ms). Due to this periodic incrementation, UE 115-a may know to increment the estimated signal of MIB 210-a when comparing the estimated signal of MIB 210-a to received MIB 210-b when MIB 210-b crosses an increment boundary from MIB 210-a, which may prevent an inaccurate cell measurement based on comparing the estimated signal to received MIB 210-b. Field 215-b may be an example of a second field, the contents of which may change infrequently (e.g., during a system information change or when cell usage at UE 115-a is barred). UE 115-a may not compensate for the infrequent changes to field 215-b, as the infrequent changes may be unlikely to affect cell measurements. Field 215-c may be an example of a third field, the contents of which may not change over time (e.g., deployment-dependent information such as operation mode information), thus not contributing to cell measurement errors due to content variation.

However, some fields 215 may dynamically change in value such that UE 115-a may be unable to compensate for the changes when encoding MIB 210-a. Field 215-d may be an example of a fourth field, the content of which may be undefined or reserved at a particular version of a communications protocol (e.g., for which some UEs are provisioned or configured). Field 215-*d* may be later defined to dynamically change from one MIB 210 to another. Accordingly, UE 115-*a* may be unable to anticipate and compensate for any changes in field 215-*d* from MIB 210-*a* and MIB 210-*b*, which may result in inaccurate cell measurements based on the estimated signal generated from MIB 210-*a* and the received MIB 210-*b*.

Base station 105-*a* may transmit an indication 220 which may indicate the frequency at which content of MIB 210 (e.g., field 215-*d*) is expected to change from MIB 210-*a* to MIB 210-*b*. In some examples, base station 105-*a* transmits indication 220 in NPBCH 205-*a*. Based on indication 220, UE 115-*a* may determine whether to utilize NPBCH 205-*a* when making cell measurements (e.g., received signal measurements, including received signal strength or received signal quality) for communications between base station 105-*a* and UE 115-*a*. For example, indication 220 may indicate that the content of field 215-*d* may change frequently (e.g., possibly every few radio frames or every NPBCH transmission). In such a case, UE 115-*a* may determine that it is too costly to attempt to compensate for the changes in field 215-*d* or that compensation may not be feasible, which may result in UE 115-*a* determining to not utilize NPBCH 205-*a* for cell measurements. In other cases, indication 220 may indicate that the content of field 215-*d* may change infrequently enough (e.g., less frequently than a system information modification period or the SFN) that the changes will not have a significant effect on cell measurements. In such cases, UE 115-*a* may determine to utilize NPBCH 205-*a* for cell measurements.

In some examples, indication 220 may be one bit (e.g., or field) in MIB 210. When indication 220 is set to a value of zero (0), UE 115-*a* may determine that a field 215-*d* of an MIB 210 does not change or changes infrequently. When indication 220 is set to a value of one (1), UE 115-*d* may determine that a field 215-*d* of MIB 210 may change frequently enough to cause errors in cell measurement. In other examples, indication 220 may be a field in a system information block (SIB) transmitted by the cell. UE 115-*a* may determine that a field 215 (e.g., field 215-*d*) of an MIB 210 changes frequently when indication 220 is included as a field in a SIB, and UE 115-*a* may determine that a field 215 (e.g., field 215-*d*) of MIB 210 does not change or changes infrequently when indication 220 is not included as a field in a SIB or is set to a different value. In some cases, indication 220 may be carried via a control channel (e.g., narrowband physical downlink control channel (NPDCCH)). For example base station 105 may include information of whether the portion of the MIB 210 changes frequently during a direct indication for paging or other common control signaling. UE 115-*a* may determine that a field 215 (e.g., field 215-*d*) of an MIB 210 changes frequently when indication 220 is included as a field in an NPDCCH control message, and UE 115-*a* may determine that the field 215 does not change or changes infrequently when indication 220 is not included as a field in an NPDCCH control message or is set to a different value.

In some cases, field 215-*d* may include multiple indicators (e.g., multiple bits). Indication 220 may include one or more bits (e.g., or fields) which may correspond to each of multiple fields 215-*d*, each of which may be one or more bits in length. For example, field 215-*d* may be eleven (11) bits in length, and indication 220 may include eleven (11) bits (e.g., or fields) such that each bit of indication 220 corresponds to a different bit of field 215-*d* (e.g., different subsections, or subfields, of field 215-*d*). In such a case, each bit of indication 220 may indicate the frequency at which the corresponding bit of field 215-*d* is expected to change. Such a configuration of indication 220 may result in UE 115-*a* having more options when determining to utilize a NPBCH 205 for cell measurement. For example, when a few (e.g., one (1), two (2), or three (3)) bits of field 215-*d* are indicated to change frequently, UE 115-*a* may expend relatively few resources to hypothesize multiple possible contents of a received MIB 210 (e.g., MIB 210-*b*) and generate different estimated signals of a MIB 210 (e.g., MIB 210-*a*), which may allow UE 115-*a* to utilize a NPBCH 205 for cell measurement.

In some cases, indication 220 may further indicate the frequency at which the content of a NPBCH transmission of a second cell are expected to change. For example, indication 220 may indicate the frequency at which the content of NPBCH 205-*b* is expected to change. Indication 220 may be provided per neighbor cell (e.g., per cell identifier) or per frequency band (e.g., per EARFCN), for example.

Indication 220 may signal a time duration during which MIB 210 contents do not change (e.g., except for SFN and HFN). For example, indication 220 may indicate that MIB contents do not change more frequently than once every ten (10) seconds (e.g., or thirty (30) seconds or sixty (60) seconds). Additionally or alternatively, indication 220 may signal a period of time during which MIB 210 contents do not change. For example, indication 220 may indicate that the contents of a MIB 210 do not change during periods of time that do not overlap with system information modification periods. Accordingly, UE 115-*a* may determine to utilize a NPBCH 205 associated with indication 220 for cell measurements based on indication 220. In some examples, indication 220 may apply to one or more of fields 215-*b* and 215-*d* of a MIB 210, or indication 220 may include different indicators for different fields 215.

In some examples, indication 220 may be implicitly signaled. For example, base station 105-*a* may enable or disable NPBCH 205-*a* utilization for cell measurements (e.g., via an indicator in MIB, SIB, NPDCCH, or RRC signaling). When NPBCH 205-*a* utilization is enabled, UE 115-*a* may determine that the contents of NPBCH 205-*a* (e.g., field 215-*d* of MIB 210-*a* or MIB 210-*b*) do not change frequently or at all, and may thus determine to utilize NPBCH 205-*a* for cell measurement. When NPBCH 205-*a* utilization is disabled, UE 115-*a* may determine that the contents of NPBCH 205-*a* may change frequently and may thus determine to not utilize NPBCH 205-*a* for cell measurement.

UE 115-*a* may further use indication 220 to determine whether UE 115-*a* may use cross-TTI NPBCH decoding, which may allow UE 115-*a* to soft combine bits (e.g., or fields) across multiple NPBCH instances (e.g., across MIB 210-*a* and MIB 210-*b*). That is, when indication 220 indicates that little or no change occurs in the content between MIB 210-*a* and MIB 210-*b*, for example, UE 115-*a* may determine to combine soft information across multiple instances of MIB 210 when decoding NPBCH 205-*a*. Combining information across multiple instances of MIB 210 may allow the UE to increase a supported coverage enhancement level, for example.

In some examples, UE 115-*a* may perform hypothesis testing (e.g., detection) when indication 220 indicates that frequent changes can occur for the content of a NPBCH 205 transmission, Hypothesis testing may help UE 115-*a* determine whether a change has actually occurred. For example, when the hypothesis testing determines that NPBCH 205-*a* has changed from MIB 210-*a* to MIB 210-*b* (e.g., a normalized cross-correlation between received MIB 210-*b* and an estimated signal generated from of MIB 210-*a* is below a threshold value), UE 115-*a* may determine to not utilize NPBCH 205-*a* for cell measurements. In such a case, UE 115-*a* may utilize reference signals for cell measurement.

Once the received signal strength measurement or the received signal quality measurement has been made, UE 115-*a* may communicate with one or more of base station 105-*a* or base station 105-*b* based on the received signal strength measurement or the received signal quality measurement. For example, UE 115-*a* may determine to reselect to base station 105-*b* from base station 105-*a* based on one or more of the received signal quality measurements or received signal strength measurements made on both base station 105-*a* and base station 105-*b*. When communication with one or more of base station 105-*a*, for example, UE 115-*a* may transmit uplink communications with an uplink power based on received signal quality measurements or received signal strength measurements made on base station 105-*a*.

Figure 3:
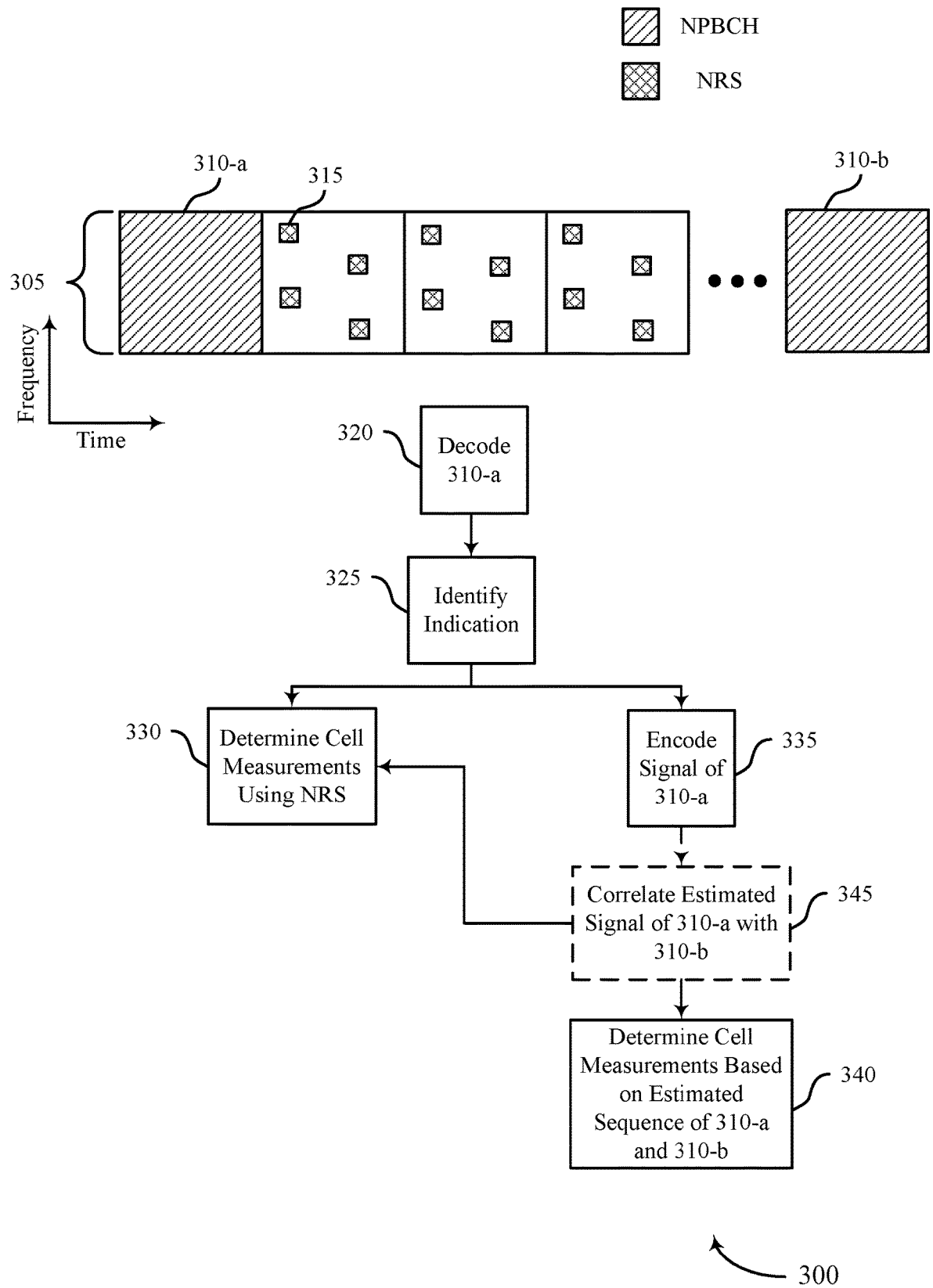
FIG. 3 illustrates an example of a time and frequency resource allocation that supports interaction of physical channel changes with physical channel based cell measurements in accordance with aspects of the present disclosure.

FIG. 3 illustrates an example of a time and frequency resource allocation 300 that supports interaction of physical channel changes with physical channel based cell measurements in accordance with aspects of the present disclosure. In some examples, time and frequency resource allocation 300 may be implemented by aspects of wireless communications systems 100 and 200. Time and frequency resource allocation 300 may be implemented by one or more wireless communications devices (e.g., base stations and UEs), which may communicate via a wireless communications link over a narrowband channel 305, the time and frequency resources of which may be utilized for reference signal transmission and data transmissions. NPBCH 310 may be one such data transmission and may be transmitted by a base station to a UE according to a downlink transmission configuration.

In some examples, a UE may determine the received signal strength or the received signal quality of narrowband channel 305 as part of a wireless communications procedure (e.g., a cell reselection procedure). When making a cell measurement (e.g., a received signal strength measurement or a received signal quality measurement), the UE may measure a narrowband reference signal (NRS) 315, which may have a known signal or sequence over predetermined resources for the purposes of channel measurement and reporting. However, NRS 315 may be relatively sparse (e.g., 4, 8, or 16 resource elements per subframe or TTI). As shown, NPBCH 310 may, although transmitted periodically, provide more resources to measure than NRS 315, which may result in a more accurate cell measurement procedure when compared to measuring cell characteristics using only NRS 315. Because using NPBCH 310 may allow the UE to perform cell measurements over a shorter period of time, utilizing NPBCH 310 for cell measurements may require less power than utilizing NRS 315, and may allow for faster cell reselection or cell access. Thus, in order to increase channel measurement accuracy or to decrease power consumption when measuring narrowband channel 305, the UE may additionally or alternatively utilize NPBCH 310 for cell measurements.

For example, at 320, a UE may decode NPBCH 310-*a*, which is transmitted by a base station. As described above with reference to FIG. 2, the content of NPBCH 310 transmissions may change from one NPBCH 310 transmission to another (e.g., from NPBCH 310-*a* to NPBCH 310-*b*), which may result in cell measurement inaccuracies at the UE. Accordingly, at 325, the base station may transmit, and the UE may identify, an indication of the frequency at which NPBCH 310 transmissions are expected to change from one NPBCH 310 transmission to another.

In some cases, the indication may identify that the NPBCH 310 transmissions change frequently from one NPBCH 310 transmission to another, which may result in inefficient or infeasible utilization of NPBCH 310 for cell measurements. Thus, at 330, the UE may determine to utilize only NRS 315 for cell measurements.

Alternatively, the indication may identify that the NPBCH 310 transmissions do not change (e.g., except for fields with predictable changes) from one NPBCH 310 transmission to another (e.g., or change infrequently), which may result in the UE determining to utilize NPBCH 310 for cell measurement. Accordingly, at 335, the UE may encode an estimated signal of the content of NPBCH 310-*a*, and, at 340, determine a cell measurement based on a comparison between the estimated signal of NPBCH 310-*a* and NPBCH 310-*b*.

As described with reference to FIG. 2, the UE may perform hypothesis testing at 345 to determine if significant change occurs between the estimated signal of NPBCH 310-*a* and received NPBCH 310-*b* upon receiving an indication that NPBCH 310 transmissions are expected to change frequently from one NPBCH 310 transmission to another. If the hypothesis testing determines that content has not significantly changed between the estimated signal generated from NPBCH 310-*a* and received NPBCH 310-*b* (e.g., a correlation between the expected NPBCH and received NPBCH is greater than a threshold), the UE may determine a cell measurement based on a comparison between the estimated signal of NPBCH 310-*a* and NPBCH 310-*b* at 340. If the hypothesis testing determines that content has significantly changed (e.g., according to the comparison of the correlation with the threshold) between the estimated signal of NPBCH 310-*a* and received NPBCH 310-*b*, the UE may determine a cell measurement based on NRS 315 without utilizing NPBCH 310 at 330.

As described above with reference to FIG. 2, the indications may be transmitted during subframes (or TTIs) associated with NPBCH 310 (e.g., in the MIB), in a SIB, in a downlink control channel (e.g., NPDCCH), or in RRC signaling.

Figure 4:
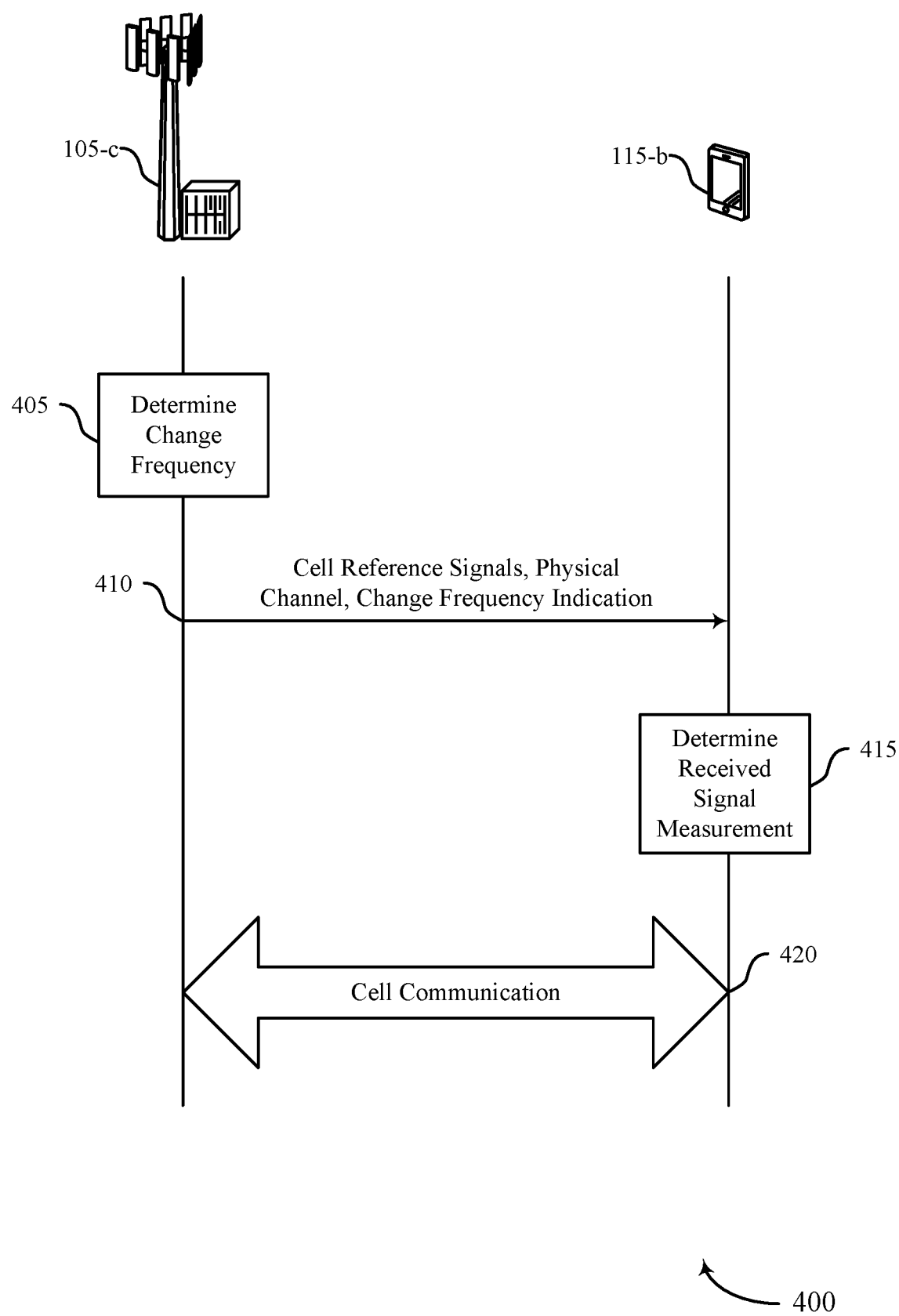
FIG. 4 illustrates an example of a process flow that supports interaction of physical channel changes with physical channel based cell measurements in accordance with aspects of the present disclosure.

FIG. 4 illustrates an example of a process flow 400 that supports interaction of physical channel changes with physical channel based cell measurements in accordance with aspects of the present disclosure. In some examples, process flow 400 may implement aspects of wireless communications systems 100 and 200. Process flow 400 may include base station 105-*c* and UE 115-*b*, which may be examples of the corresponding devices described with reference to FIGS. 1 and 2.

At 405, base station 105-*c* may determine a frequency of change for a portion of a physical channel associated with a cell. The cell may serve a first set of UEs 115 for which the portion of the physical channel is reserved and a second set of UEs 115 for which the portion of the physical channel includes at least one or more fields including information for the cell. In some cases, determining the frequency of change may be performed, for example, by a communications manager 915 and a communications manager 1210, as described with reference to FIGS. 9 and 12, respectively, and by a physical channel manager 1020 and a physical channel manager 1110, as described with reference to FIGS. 10 and 11, respectively.

At 410, base station 105-*c* may transmit, and UE 115-*b* may receive, a cell reference signal associated with the cell, a physical channel, and an indication of the frequency of change for the portion of the physical channel. In some cases, the portion of the physical channel may include a reserved field of the physical channel. The indication may include a set of indicators (e.g., a set of bits or fields), and the portion of the physical channel may include a set of fields, where each of the set of indicators is associated with one or more of the set of fields.

In some cases, the indication may indicate one of a set of change periodicities for the portion of the physical channel. For example, the indication may indicate one of a first change periodicity associated with the frequency of change of the portion of the physical channel not satisfying a threshold and a second change periodicity associated with the frequency of change of the portion of the physical channel satisfying the threshold. In some cases, the threshold may be associated with no change for the portion of the physical channel. The physical channel may include, for example, a physical broadcast channel (PBCH). In some cases, transmitting the cell reference signal, the physical channel, and the indication of the frequency of change may be performed, for example, by a communications manager 915 and a communications manager 1210, as described with reference to FIGS. 9 and 12, respectively, and by a cell communications manager 1025 and a cell communications manager 1115, as described with reference to FIGS. 10 and 11, respectively.

In some examples, base station 105-c may transmit, and UE 115-b may receive, the indication over the physical channel of the cell, a second physical channel of the cell, a control channel of the cell, or a configuration message for the cell. In other examples, UE 115-b may receive the indication over a third physical channel of a second cell, a control channel of the second cell, or a configuration message for the second cell.

In some cases, base station 105-c may transmit, and UE 115-b may receive, a second indication of a frequency of change for a second portion of a second physical channel of a second cell, the transmitting the second indication being over the physical channel, a second physical channel of the cell, a control channel of the cell, or a configuration message.

At 415, UE 115-b may determine a received signal measurement for the cell based on one of a cell reference signal associated with the cell or a combination of the cell reference signal, an estimated physical channel transmission, and a received physical channel transmission, where the determining is based on the indication of the frequency of change. For example, UE 115-b may determine at least one of the received signal strength measurement or the received signal quality measurement for the cell based on the estimated signal for the physical channel and the received signal for the physical channel. In some cases, determining the received signal measurement may be performed, for example, by a communications manager 515 and a communications manager 810, as described with reference to FIGS. 5 and 10, respectively, and by a cell measurement manager 620 and a cell measurement manager 710, as described with reference to FIGS. 6 and 7, respectively.

In some cases, UE 115-b may determine the received signal measurement by decoding a first received sequence for the physical channel, generating a set of estimated physical channel transmissions for the physical channel based on the indication and the decoded first received sequence, and correlating the set of estimated physical channel transmissions to a second received physical channel transmission.

In some examples, UE 115-b may, based on the indicated frequency of change of the portion of the physical channel, determining the received signal measurement may be based exclusively on measurements of the cell reference signal.

In some instances, UE 115-b may determine the received signal measurement by decoding a received sequence for the physical channel, generating the estimated physical channel transmission based on the decoded received sequence, and determining a correlation of the estimated physical channel transmission to a second received physical channel transmission. In some cases, the decoding may include determining, based on the indication, a likelihood that a set of sequences associated with a set of received physical channel transmissions has no change for the portion of the physical channel and soft-combining the set of received physical channel transmissions.

In some examples, UE 115-b may determine the received signal measurement by determining that the correlation of the estimated physical channel transmission to the second received physical channel transmission is below a threshold. Based on determining that the correlation is below the threshold, the UE 115-b may determine the received signal measurement based exclusively on measurements of the cell reference signal.

At 420, UE 115-b and base station 105-c may communicate based on the determined received signal measurement. In some cases, base station 105-c may receive a random access message from UE 115-b, where UE 115-b may perform cell reselection to the cell based on a measurement of the physical channel, and where the measurement of the physical channel may be based on the indication. In some examples, UE 115-b may transmit an uplink transmission to the cell, where an uplink power for the uplink transmission is based on the received signal measurement. In some cases, the measurement of the physical channel may be based on the indication. In some cases, the communicating may be performed at UE 115-b, for example, by a communications manager 515 and a communications manager 810, as described with reference to FIGS. 5 and 8, respectively, and by a cell manager 625 and a cell manager 715, as described with reference to FIGS. 6 and 7, respectively. In some cases, the communicating may be performed at base station 105-c, for example, by a communications manager 915 and a communications manager 1210, as described with reference to FIGS. 9 and 12, respectively, and by a cell communications manager 1025 and a cell communications manager 1115, as described with reference to FIGS. 10 and 11, respectively.

In some cases, UE 115-b may report channel quality for the cell to a base station, for example, where the reported channel quality is based on the received signal measurement, which may be based on the indication.

Figure 5:
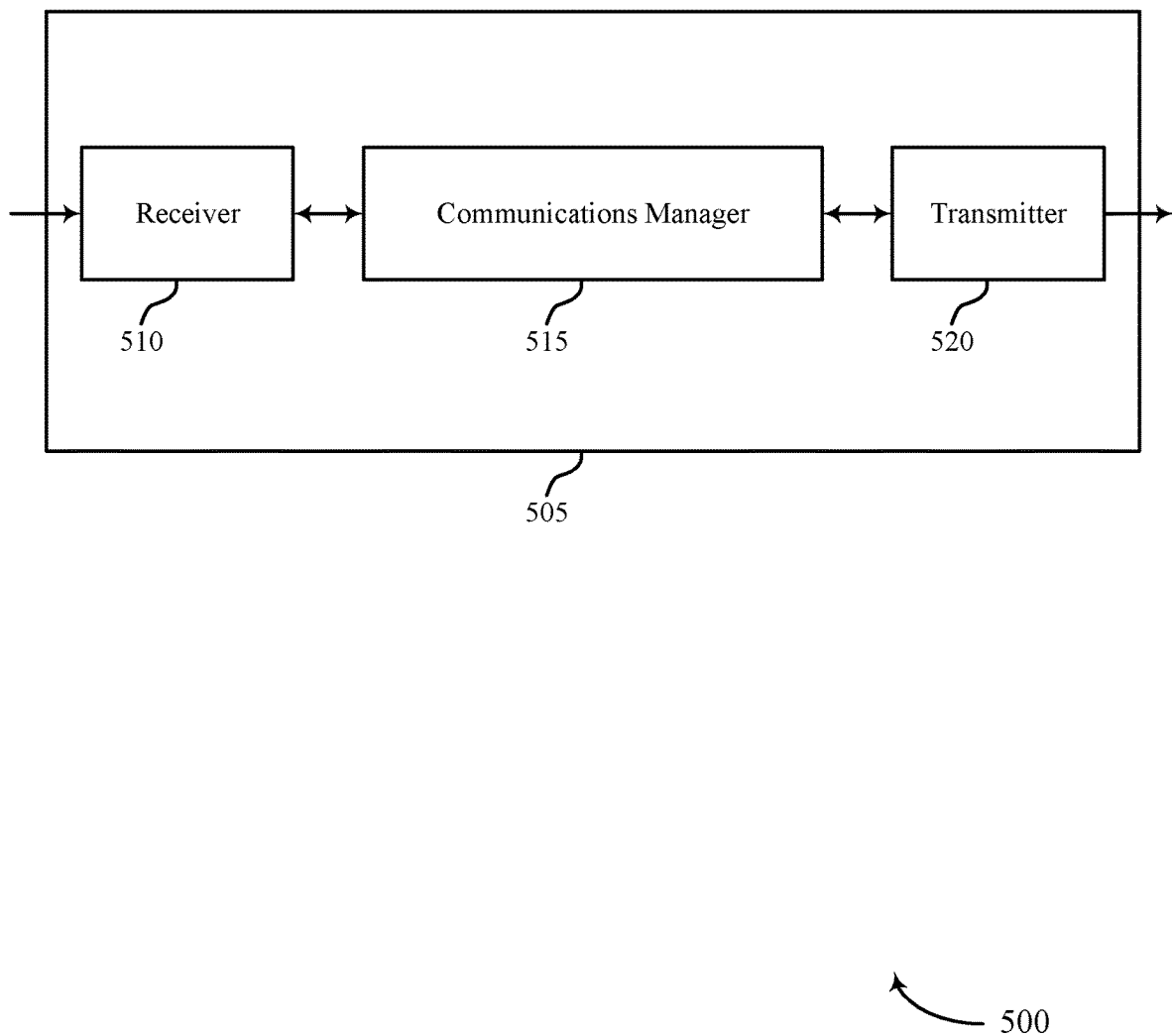
FIGS. 5 and 6 show block diagrams of devices that support interaction of physical channel changes with physical channel based cell measurements in accordance with aspects of the present disclosure.

FIG. 5 shows a block diagram 500 of a device 505 that supports interaction of physical channel changes with physical channel based cell measurements in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to interaction of physical channel changes with physical channel based cell measurements).

Information may be passed on to other components of the device 505. The receiver 510 may be an example of aspects of the transceiver 820 described with reference to FIG. 8. The receiver 510 may utilize a single antenna or a set of antennas.

The communications manager 515 may receive an indication of a frequency of change of a portion of a physical channel associated with a cell. The communications manager 515 may determine a received signal measurement for the cell based on one of a cell reference signal associated with the cell or a combination of the cell reference signal, an estimated physical channel transmission, and a received physical channel transmission, where the determining is based on the indication of the frequency of change. For example, the communications manager 515 may determine at least one of the received signal strength measurement or the received signal quality measurement for the cell based on the estimated signal for the physical channel and the received signal for the physical channel. The communications manager 515 may communicate with the cell based on the determined received signal measurement. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
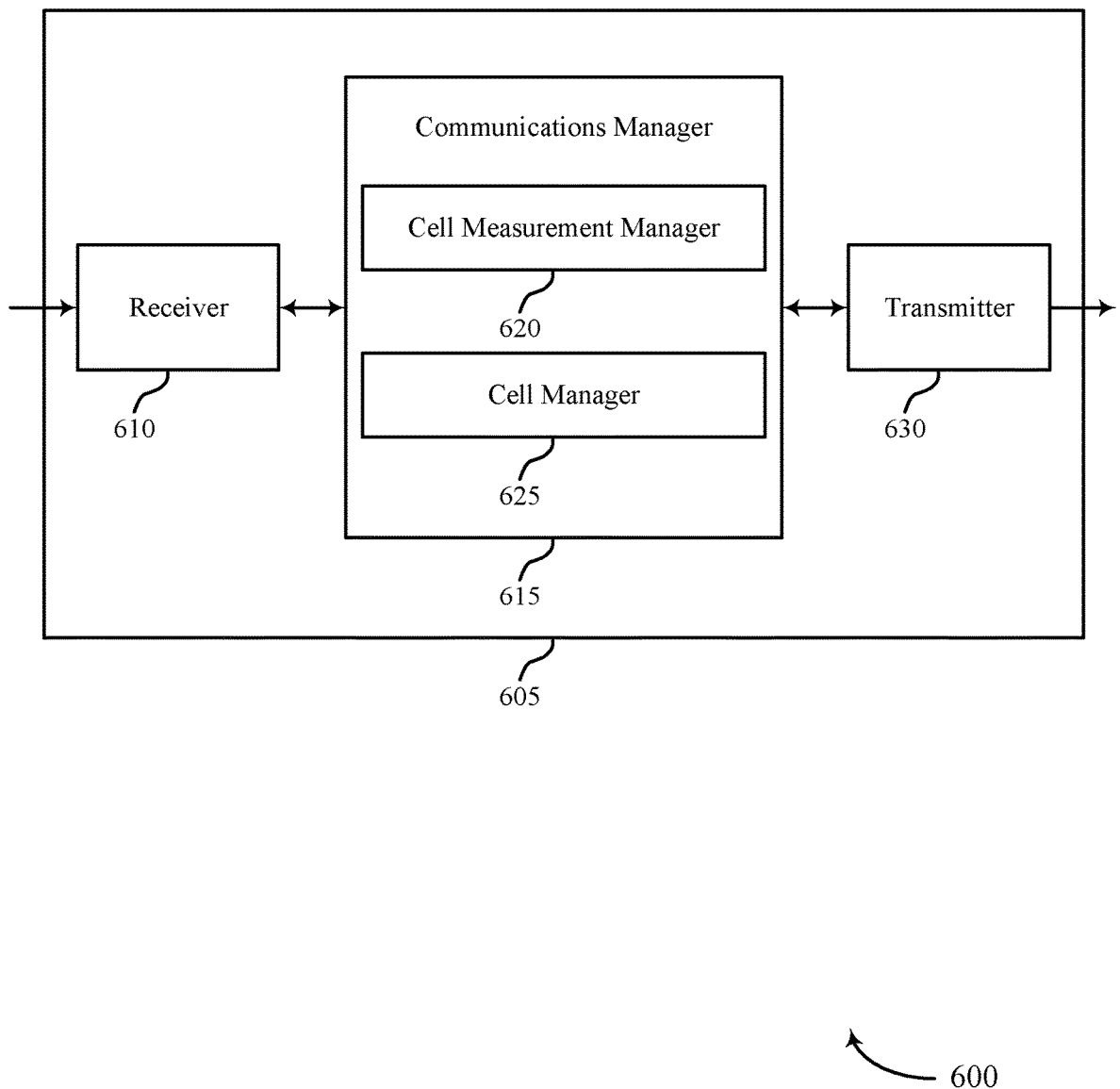

FIG. 6 shows a block diagram 600 of a device 605 that supports interaction of physical channel changes with physical channel based cell measurements in accordance with aspects of the present disclosure. The device 605 may be an example of aspects of a device 505 or a UE 115 as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to interaction of physical channel changes with physical channel based cell measurements). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a cell measurement manager 620 and a cell manager 625. The communications manager 615 may be an example of aspects of the communications manager 810 described herein.

The cell measurement manager 620 may receive an indication of a frequency of change of a portion of a physical channel associated with a cell. The cell measurement manager 620 may determine a received signal measurement for the cell based on one of a cell reference signal associated with the cell or a combination of the cell reference signal, an estimated physical channel transmission, and a received physical channel transmission, where the determining is based on the indication of the frequency of change. For example, the cell measurement manager 620 may determine at least one of the received signal strength measurement or the received signal quality measurement for the cell based on the estimated signal for the physical channel and the received signal for the physical channel.

The cell manager 625 may communicate with the cell based on the determined received signal measurement.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
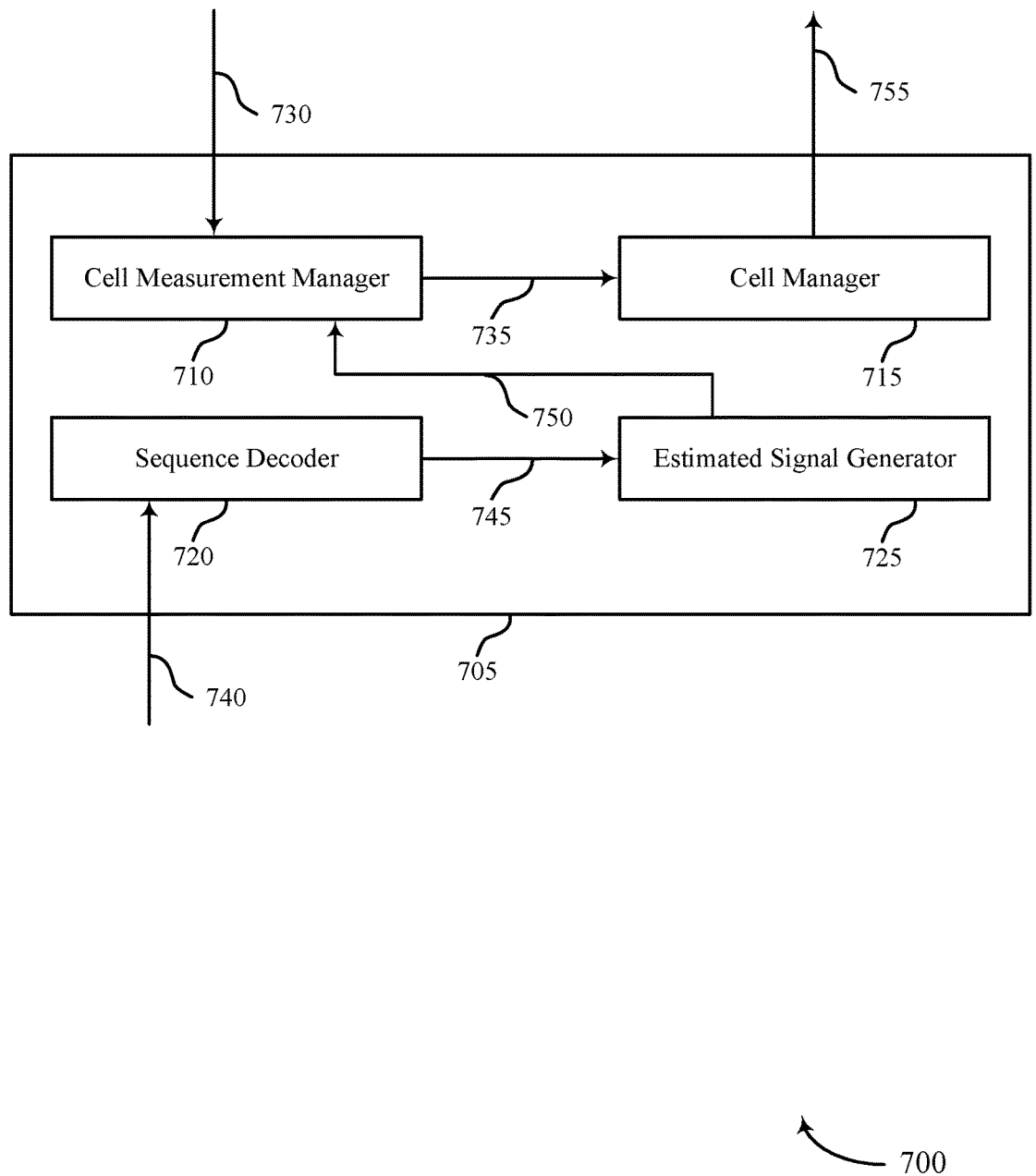
FIG. 7 shows a block diagram of a communications manager that supports interaction of physical channel changes with physical channel based cell measurements in accordance with aspects of the present disclosure.

FIG. 7 shows a block diagram 700 of a communications manager 705 that supports interaction of physical channel changes with physical channel based cell measurements in accordance with aspects of the present disclosure. The communications manager 705 may be an example of aspects of a communications manager 515, a communications manager 615, or a communications manager 810 described herein. The communications manager 705 may include a cell measurement manager 710, a cell manager 715, a sequence decoder 720, and an estimated signal generator 725. Each of these modules may communicate, directly or indirectly, with one another (e.g., via one or more buses).

The cell measurement manager 710 may receive a signal 730 (e.g., via a receiver 510 or receiver 610, as described with reference to FIGS. 5 and 6, respectively) including an indication of a frequency of change of a portion of a physical channel associated with a cell. In some examples, the cell measurement manager 710 may determine a received signal measurement for the cell based on one of a cell reference signal associated with the cell or a combination of the cell reference signal, an estimated physical channel transmission, and a received physical channel transmission, where the determining is based on the indication of the frequency of change. In some cases, the received signal measurement may include at least one of a received signal strength measurement or a received signal quality measurement. For example, the cell measurement manager 710 may determine at least one of the received signal strength measurement or the received signal quality measurement for the cell based on the estimated signal for the physical channel and the received signal for the physical channel. In some cases, the cell measurement manager 710 may correlate the set of estimated physical channel transmissions to a second received physical channel transmission, for example, according to an estimated signal 750 received from the estimated signal generator 725. In some cases, based on the indicated frequency of change of the portion of the physical channel, the determining the received signal measurement may be based exclusively on measurements of the cell reference signal. In some cases, the cell measurement manager 710 may pass information 735 indicating, for example, the received signal measurement to the cell manager 715.

In some examples, the cell measurement manager 710 may determine the received signal measurement by determining that the correlation of the estimated physical channel transmission to the second received physical channel transmission is below a threshold. Based on determining that the correlation is below the threshold, the cell measurement manager 710 may determine the received signal measurement based exclusively on measurements of the cell reference signal.

In some cases, the portion of the physical channel may include a reserved field of the physical channel. In some examples, the indication may include a set of indicators (e.g., bits or fields), and the portion of the physical channel may include a set of fields, where each of the set of indicators is associated with one or more of the set of fields. In some instances, the receiving the indication includes receiving the indication over the physical channel of the cell, a second physical channel of the cell, a control channel of the cell, a configuration message for the cell, a third physical channel of a second cell, a control channel of the second cell, or a configuration message for the second cell. In some aspects, the indication may indicate one of a set of change periodicities for the portion of the physical channel. For example, the indication may indicate one of a first change periodicity associated with the frequency of change of the portion of the physical channel not satisfying a threshold and a second change periodicity associated with the frequency of change of the portion of the physical channel satisfying the threshold. In some cases, the threshold may be associated with no change for the portion of the physical channel. In some cases, the physical channel includes a PBCH.

The cell manager 715 may communicate information 755 with the cell based on the determined received signal measurement, for example, as may have been received in the information 735. In some examples, the cell manager 715 may perform cell reselection to the cell based on the received signal measurement. In some cases, the cell manager 715 may transmit an uplink transmission, where an uplink power for the uplink transmission is based on the received signal measurement. In some instances, the cell manager 715 may report channel quality to a base station, where the reported channel quality is based on the received signal measurement.

The sequence decoder 720 may receive a signal 740 (e.g., via a receiver 510 or receiver 610, as described with reference to FIGS. 5 and 6, respectively) including a first sequence for the physical channel, and the sequence decoder 720 may decode the first received sequence for the physical channel. In some examples, the sequence decoder 720 may determine, based on the indication, a likelihood that a set of sequences associated with a set of received physical channel transmissions has no change for the portion of the physical channel. In some cases, the sequence decoder 720 may soft-combine the set of received physical channel transmissions. In some cases, the sequence decoder 720 may pass for example, the decoded first received sequence 745 to the estimated signal generator 725.

The estimated signal generator 725 may generate a set of estimated physical channel transmissions for the physical channel based on the indication and the decoded first received sequence, for example, as received from the sequence decoder 720 in the information 745. In some examples, the estimated signal generator 725 may generate the estimated signal based on the decoded first received sequence. In some cases, the cell measurement manager 710 may pass the generated signal 750 to the cell measurement manager 710.

Figure 8:
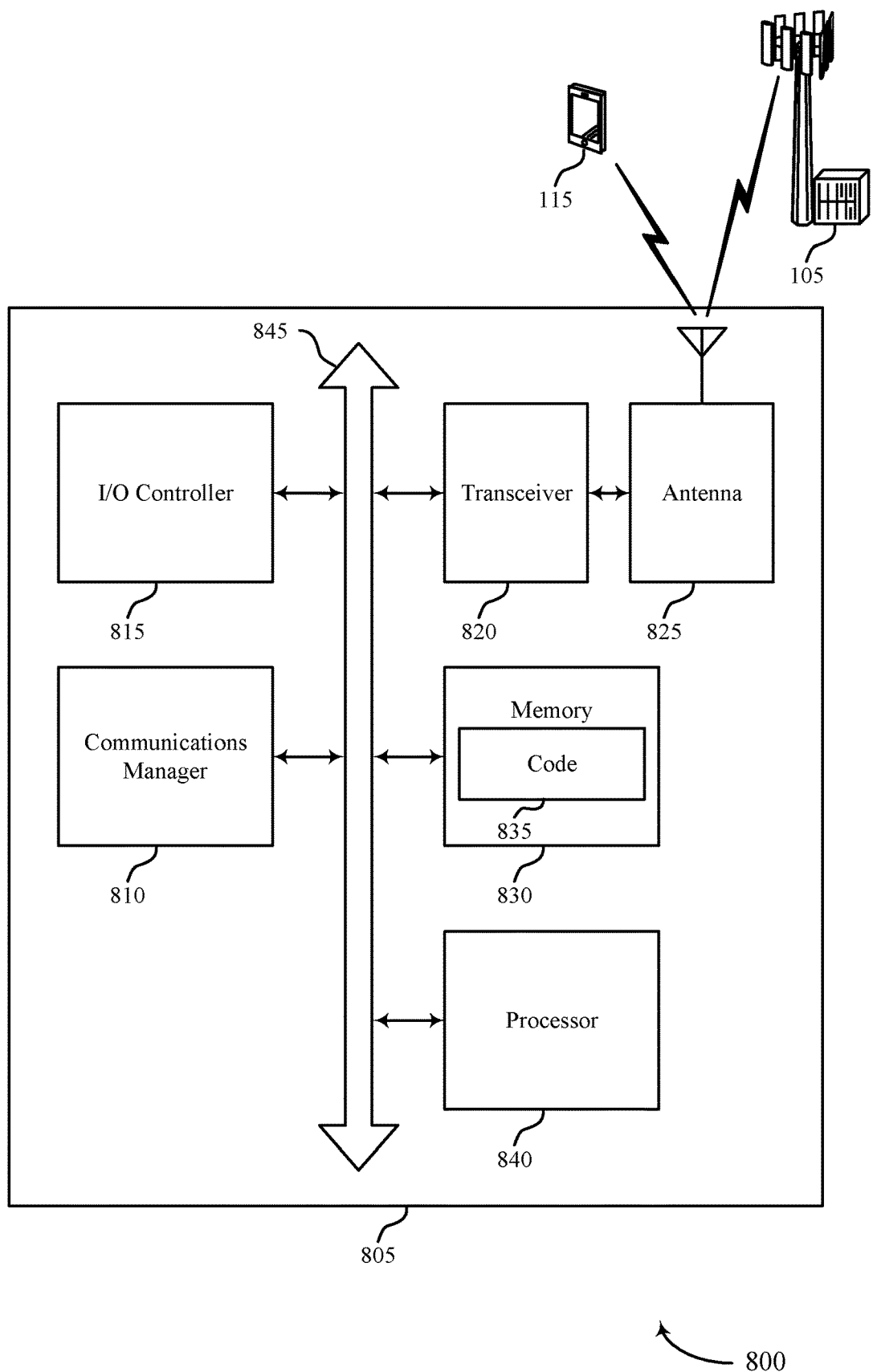
FIG. 8 shows a diagram of a system including a device that supports interaction of physical channel changes with physical channel based cell measurements in accordance with aspects of the present disclosure.

FIG. 8 shows a diagram of a system 800 including a device 805 that supports interaction of physical channel changes with physical channel based cell measurements in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive an indication of a frequency of change of a portion of a physical channel associated with a cell. The communications manager 810 may determine a received signal measurement for the cell based on one of a cell reference signal associated with the cell or a combination of the cell reference signal, an estimated physical channel transmission, and a received physical channel transmission, where the determining is based on the indication of the frequency of change. In some cases, the received signal measurement may include at least one of a received signal strength measurement or a received signal quality measurement. For example, the communications manager 810 may determine at least one of the received signal strength measurement or the received signal quality measurement for the cell based on the estimated signal for the physical channel and the received signal for the physical channel. The communications manager 810 may communicate with the cell based on the determined received signal measurement.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting interaction of physical channel changes with physical channel based cell measurements).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
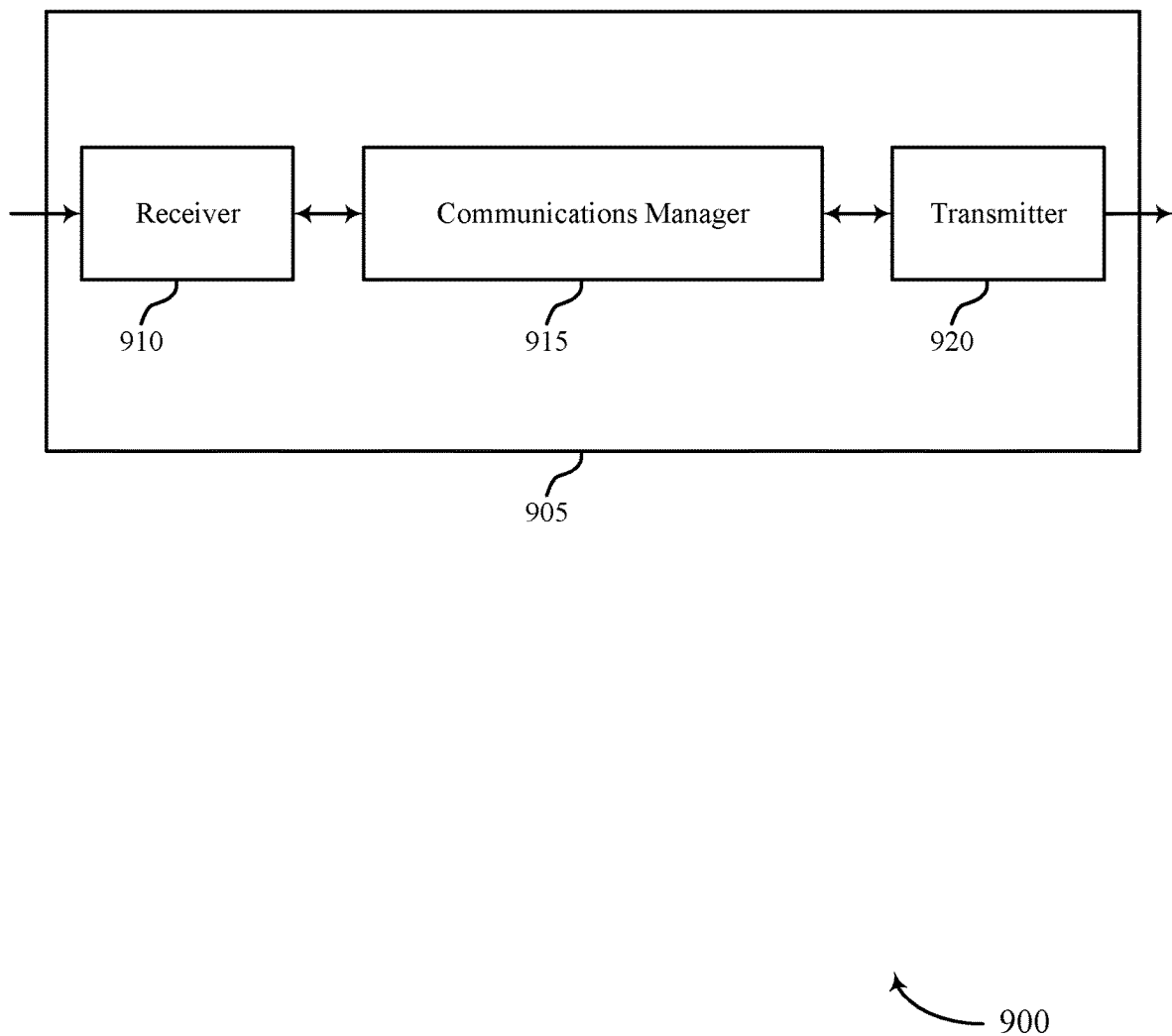
FIGS. 9 and 10 show block diagrams of devices that support interaction of physical channel changes with physical channel based cell measurements in accordance with aspects of the present disclosure.

FIG. 9 shows a block diagram 900 of a device 905 that supports interaction of physical channel changes with physical channel based cell measurements in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to interaction of physical channel changes with physical channel based cell measurements). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine a frequency of change for a portion of a physical channel associated with a cell. The communications manager 915 may a cell reference signal associated with the cell, a physical channel, and an indication of the frequency of change for the portion of the physical channel. The communications manager 915 may communicate with a UE based on the transmitted indicator. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
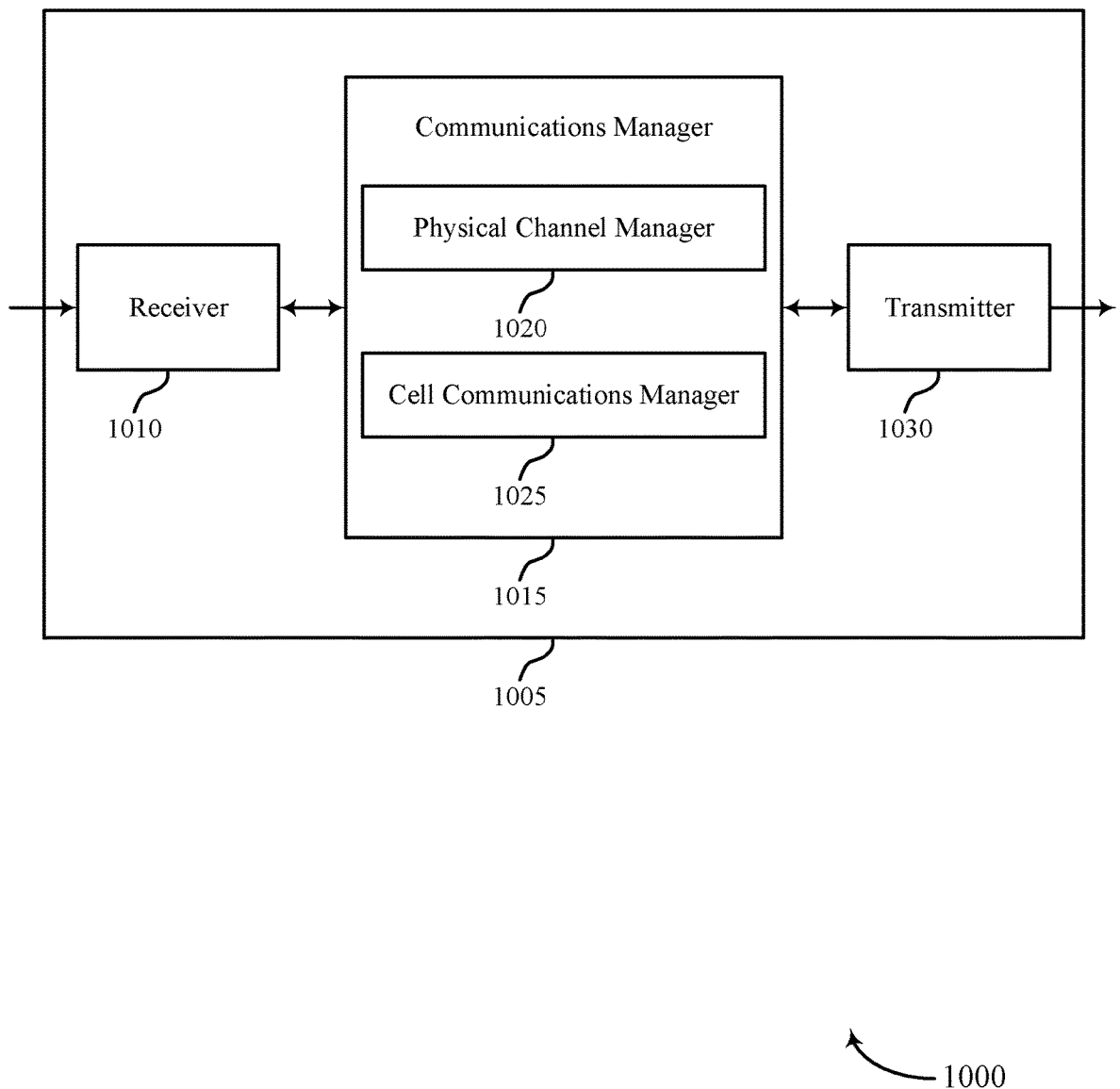

FIG. 10 shows a block diagram 1000 of a device 1005 that supports interaction of physical channel changes with physical channel based cell measurements in accordance with aspects of the present disclosure. The device 1005 may be an example of aspects of a device 905 or a base station 115 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to interaction of physical channel changes with physical channel based cell measurements). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a physical channel manager 1020 and a cell communications manager 1025. The communications manager 1015 may be an example of aspects of the communications manager 1210 described herein.

The physical channel manager 1020 may determine a frequency of change for a portion of a physical channel associated with a cell.

The cell communications manager 1025 may transmit a cell reference signal associated with the cell, a physical channel, and an indication of the frequency of change for the portion of the physical channel.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
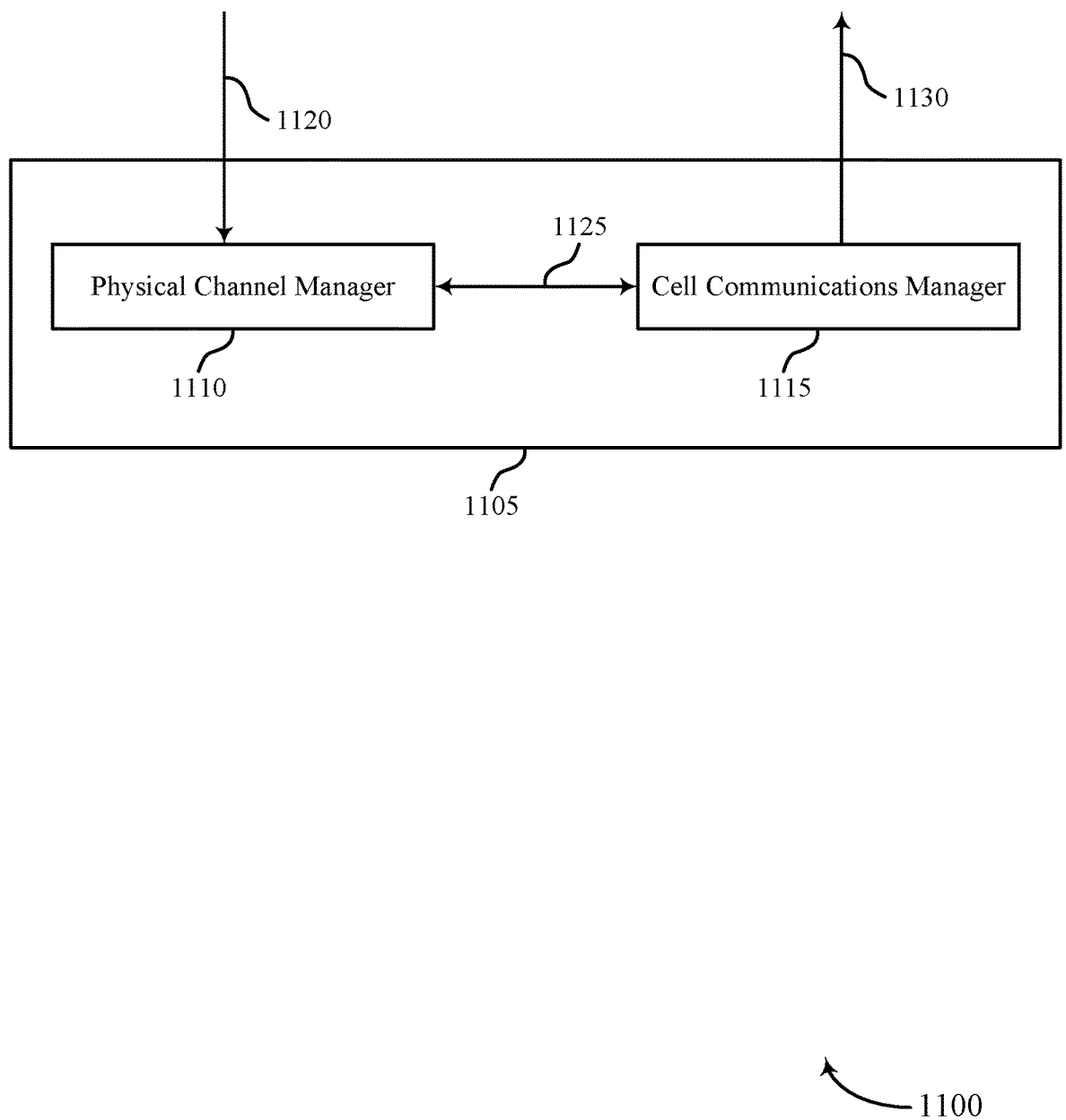
FIG. 11 shows a block diagram of a communications manager that supports interaction of physical channel changes with physical channel based cell measurements in accordance with aspects of the present disclosure.

FIG. 11 shows a block diagram 1100 of a communications manager 1105 that supports interaction of physical channel changes with physical channel based cell measurements in accordance with aspects of the present disclosure. The communications manager 1105 may be an example of aspects of a communications manager 915, a communications manager 1015, or a communications manager 1210 described herein. The communications manager 1105 may include a physical channel manager 1110 and a cell communications manager 1115. Each of these modules may communicate, directly or indirectly, with one another (e.g., via one or more buses).

In some cases, the physical channel manager 1110 may identify information 1120 for determining a frequency of change for a portion of a physical channel. Based on the information 1120, the physical channel manager 1110 may determine a frequency of change for a portion of a physical channel associated with a cell. In some cases, the cell serves a first set of UEs for which the portion of the physical channel is reserved and a second set of UEs for which the portion of the physical channel includes at least one or more fields including information for the cell. In some examples, the physical channel includes a PBCH. In some cases, the physical channel manager 1110 may pass information 1125 indicating, for example, the determined frequency of change to the cell communications manager 1115.

The cell communications manager 1115 may transmit a cell reference signal associated with the cell, a physical channel, and an indication of the frequency of change for the portion of the physical channel, for example, according to the information 1125 received from the physical channel manager 1110. In some examples, the cell communications manager 1115 may communicate information 1130 with a UE based on the transmitted indicator. In some cases, the cell communications manager 1115 may transmit in the information 1130 a second indication of a frequency of change for a second portion of a second physical channel of a second cell, the transmitting the second indication being over the physical channel, a second physical channel of the cell, a control channel of the cell, or a configuration message. In some instances, the cell communications manager 1115 may receive a random access message from the UE, where the UE performs cell reselection to the cell based on a measurement of the physical channel, and where the measurement of the physical channel is based on the indication. In some aspects, the cell communications manager 1115 may receive an uplink transmission, where an uplink power for the uplink transmission is based on a measurement of the physical channel, and where the measurement of the physical channel is based on the indication. In some examples, the cell communications manager 1115 may receive a channel quality from the UE, where the channel quality indicator is based on a measurement of the physical channel, and where the measurement of the physical channel is based on the indication.

In some cases, the indication may include a set of indicators (e.g., a set of bits or fields), and the portion of the physical channel may include a set of fields, where each of the set of indicators is associated with one or more of the set of fields. In some examples, the transmitting the indication includes transmitting the indication over the physical channel of the cell, a second physical channel of the cell, a control channel of the cell, or a configuration message for the cell. In some instances, the indication indicates one of a set of change periodicities for the portion of the physical channel. For example, the indication may indicate one of a first change periodicity associated with the frequency of change of the portion of the physical channel not satisfying a threshold and a second change periodicity associated with the frequency of change of the portion of the physical channel satisfying the threshold.

Figure 12:
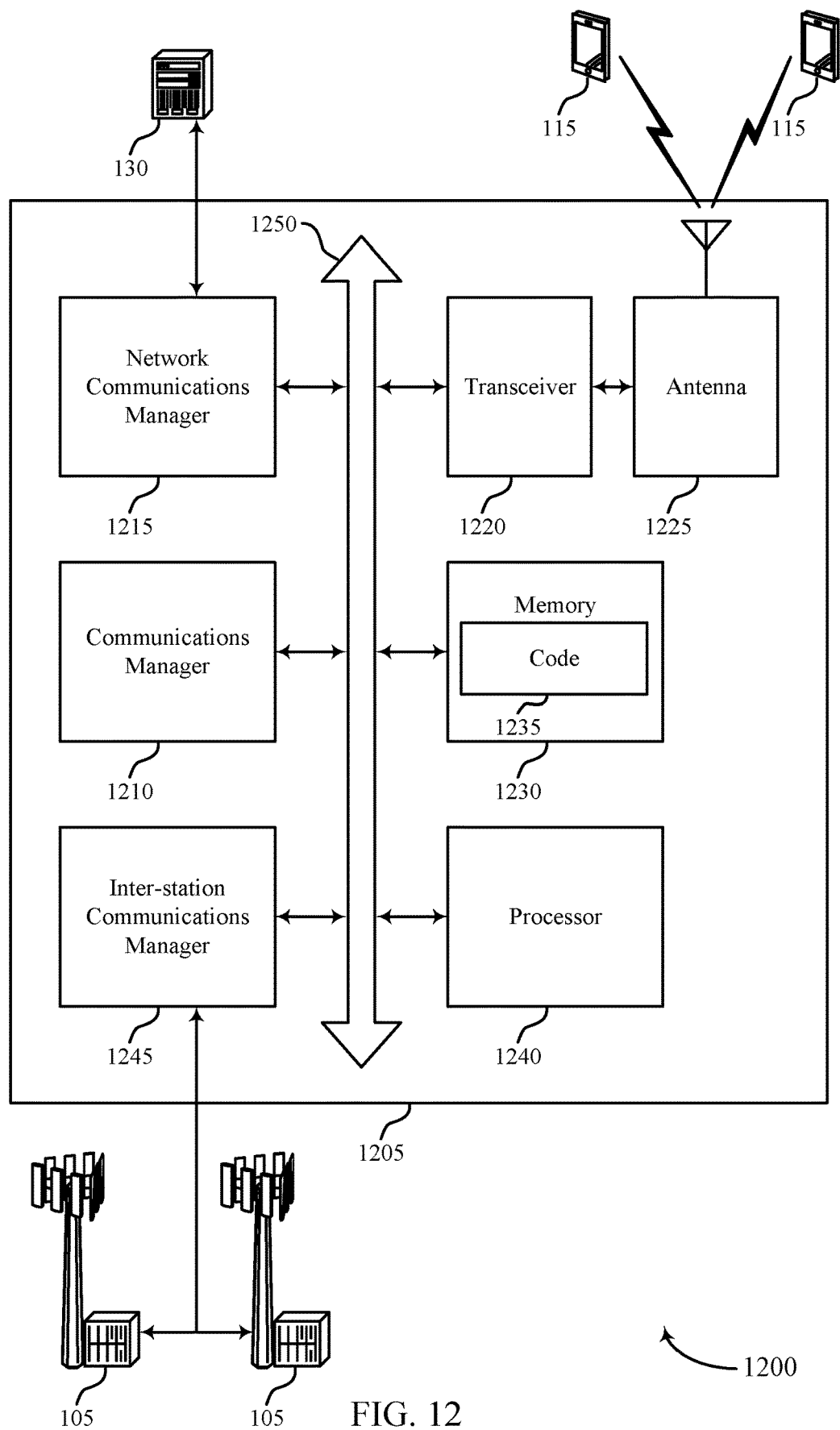
FIG. 12 shows a diagram of a system including a device that supports interaction of physical channel changes with physical channel based cell measurements in accordance with aspects of the present disclosure.

FIG. 12 shows a diagram of a system 1200 including a device 1205 that supports interaction of physical channel changes with physical channel based cell measurements in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine a frequency of change for a portion of a physical channel associated with a cell and transmit a cell reference signal associated with the cell, a physical channel, and an indication of the frequency of change for the portion of the physical channel, and communicate with a UE based on the transmitted indicator.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device #{device} to perform various functions (e.g., functions or tasks supporting interaction of physical channel changes with physical channel based cell measurements).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
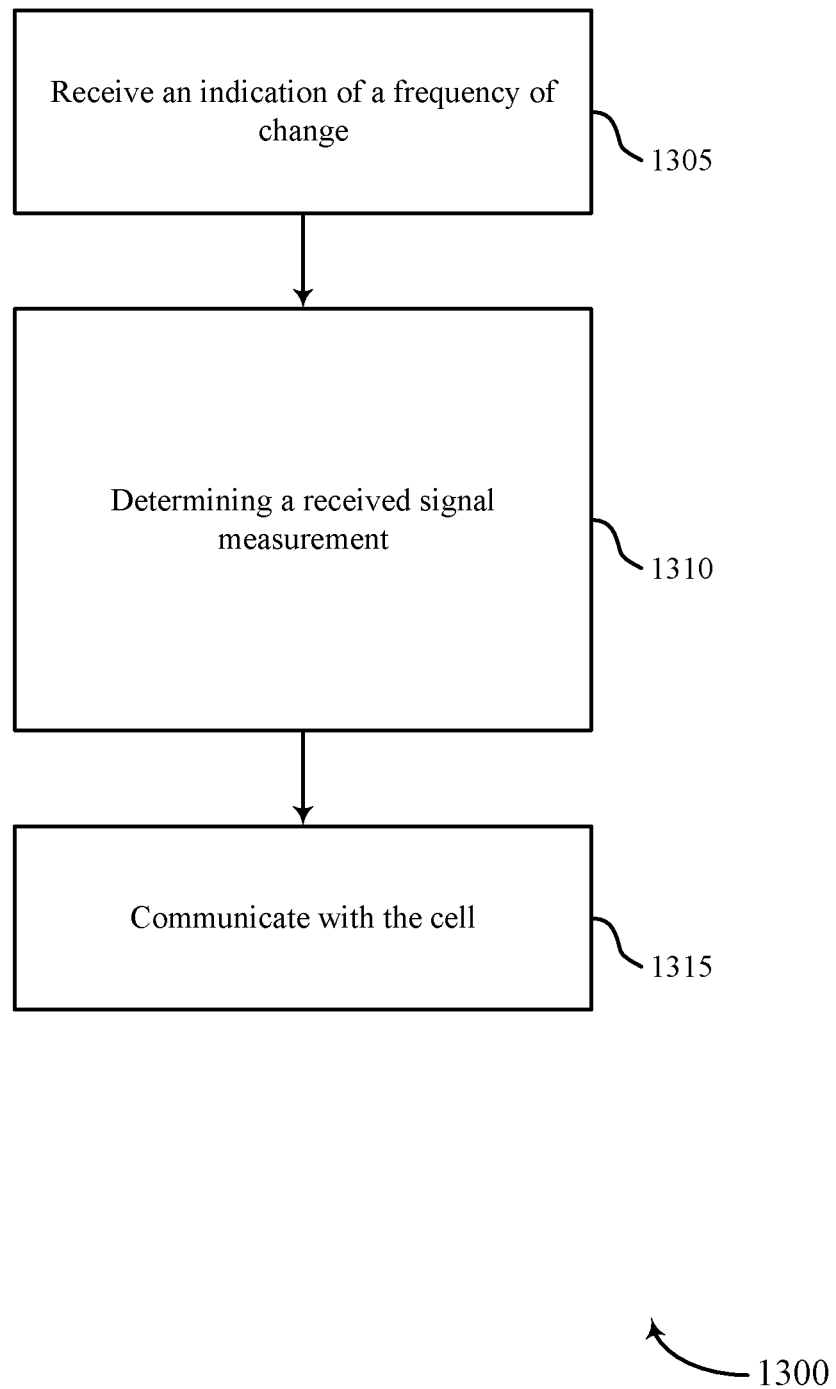
FIGS. 13 and 14 show flowcharts illustrating methods that support interaction of physical channel changes with physical channel based cell measurements in accordance with aspects of the present disclosure.

FIG. 13 shows a flowchart illustrating a method 1300 that supports interaction of physical channel changes with physical channel based cell measurements in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive an indication of a frequency of change of a portion of a physical channel associated with a cell. For example, the UE may identify time-frequency resources over which the indication of the frequency of change may be transmitted, demodulate the transmission over the time-frequency resources, and decode the demodulated transmission to obtain bits that indicate the indication of the frequency of change. The operations of 1305 may be performed according to the methods described herein. In some examples, aspects of the operations of 1305 may be performed by a cell measurement manager as described with reference to FIGS. 5 through 8.

At 1310, the UE may determine a received signal measurement for the cell based on one of a cell reference signal associated with the cell or a combination of the cell reference signal, an estimated physical channel transmission, and a received physical channel transmission, where the determining is based on the indication of the frequency of change. In some cases, the received signal measurement may include at least one of a received signal strength measurement or a received signal quality measurement. For example, the UE may determine at least one of the received signal strength measurement or the received signal quality measurement for the cell based on an estimated signal for the physical channel and the received signal for the physical channel. The operations of 1310 may be performed according to the methods described herein. In some examples, aspects of the operations of 1310 may be performed by a cell measurement manager as described with reference to FIGS. 5 through 8.

At 1315, the UE may communicate with the cell based on the determined received signal measurement. For example, the UE may identify time-frequency resources over which to transmit and receive one or more uplink or downlink transmissions, encode and modulate the uplink transmissions over the time-frequency resources, and demodulate and decode the downlink transmissions to obtain bits that indicate the respective transmissions. The operations of 1315 may be performed according to the methods described herein. In some examples, aspects of the operations of 1315 may be performed by a cell manager as described with reference to FIGS. 5 through 8.

Figure 14:
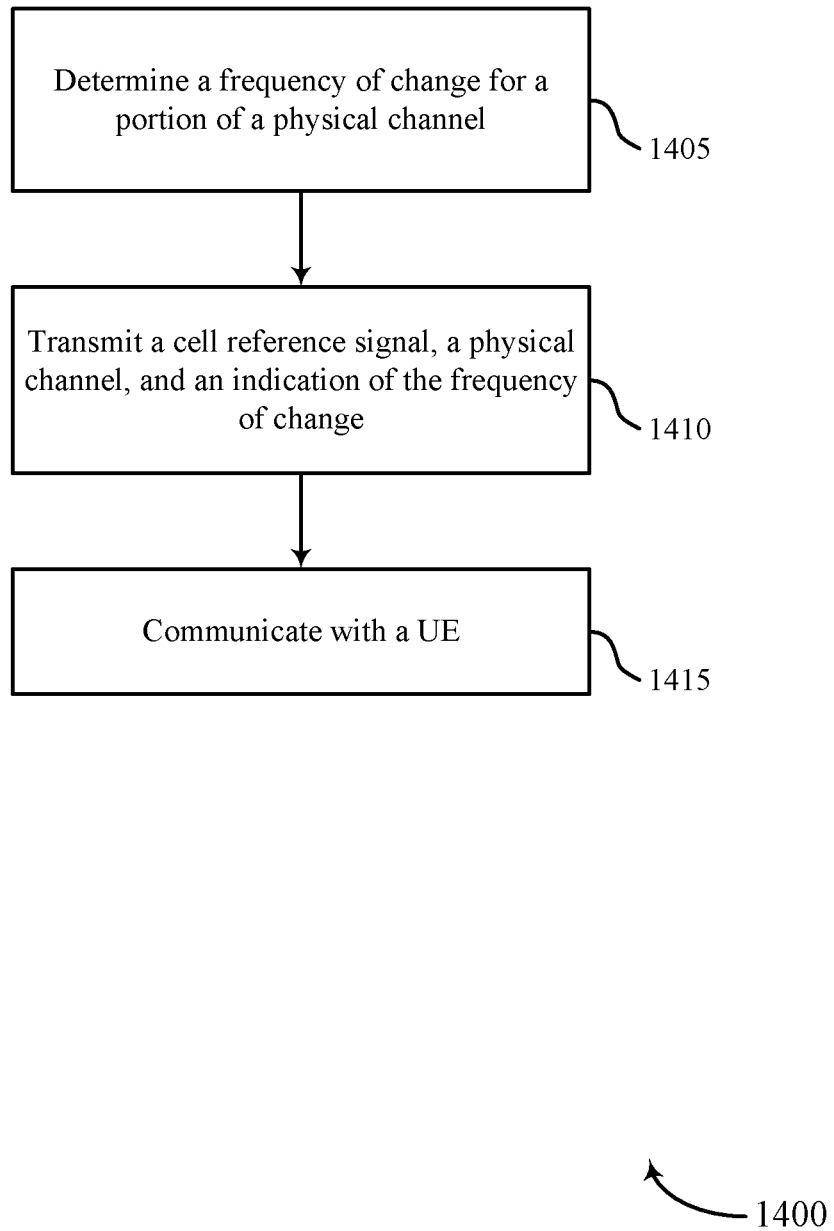

FIG. 14 shows a flowchart illustrating a method 1400 that supports interaction of physical channel changes with physical channel based cell measurements in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may determine a frequency of change for a portion of a physical channel associated with a cell. The operations of 1405 may be performed according to the methods described herein. In some examples, aspects of the operations of 1405 may be performed by a physical channel manager as described with reference to FIGS. 9 through 12.

At 1410, the base station may transmit a cell reference signal associated with the cell, a physical channel, and an indication of the frequency of change for the portion of the physical channel. For example, the base station may identify time-frequency resources over which the cell reference signal and the indication of the frequency of change may be transmitted, and may encode and modulate the bits that indicate the indication of the frequency of change to transmit the encoded and modulated bits over the identified time-frequency resources. The operations of 1410 may be performed according to the methods described herein. In some examples, aspects of the operations of 1410 may be performed by a communications manager as described with reference to FIGS. 9 through 12.

At 1415, the base station may communicate with a UE based on the transmitted indicator. For example, the base station may identify time-frequency resources over which to transmit and receive one or more uplink or downlink transmissions, encode and modulate the downlink transmissions over the time-frequency resources, and demodulate and decode the uplink transmissions to obtain bits that indicate the respective transmissions. The operations of 1415 may be performed according to the methods described herein. In some examples, aspects of the operations of 1415 may be performed by a communications manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communications media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a first broadcast channel transmission of a plurality of broadcast channel transmissions via a broadcast channel associated with a cell;
   decoding one or more fields associated with the first broadcast channel transmission;
   receiving an indication of a rate of change, wherein the rate of change is associated with information within a portion of the plurality of broadcast channel transmissions;
   determining an estimate of a second broadcast channel transmission of the plurality of broadcast channel transmissions based on the indication and the decoded one or more fields of the first broadcast channel transmission;
   receiving the second broadcast channel transmission via the broadcast channel associated with the cell;
   determining a signal measurement for the cell based on a combination of a cell reference signal associated with the cell, the estimated second broadcast channel transmission, and the received second broadcast channel transmission; and
   communicating with the cell based on the signal measurement.

2. The method of claim 1, wherein the signal measurement comprises at least one of a signal strength measurement or a signal quality measurement.

3. The method of claim 1, wherein the indication comprises a plurality of indicators and the portion of the second broadcast channel transmission comprises a plurality of fields, and wherein each of the plurality of indicators is associated with one or more of the plurality of fields.

4. The method of claim 1, wherein the determining the signal measurement comprises:
   decoding a first received sequence for the broadcast channel;
   generating a plurality of estimated broadcast channel transmissions for the broadcast channel based on the indication and the decoded first received sequence; and
   correlating the plurality of estimated broadcast channel transmissions to the received second broadcast channel transmission.

5. The method of claim 1, wherein the receiving the indication comprises receiving the indication over the broadcast channel of the cell, a second broadcast channel of the cell, a control channel of the cell, a configuration message for the cell, a third broadcast channel of a second cell, a control channel of the second cell, or a configuration message for the second cell.

6. The method of claim 1, wherein the indication indicates one of a first change periodicity associated with the rate of change associated with the information within the portion of the second broadcast channel transmission not satisfying a condition and a second change periodicity associated with the rate of change associated with the information within the portion of the second broadcast channel transmission satisfying the condition.

7. The method of claim 6, wherein the condition is associated with no change for the information within the portion of the second broadcast channel transmission.

8. The method of claim 1, wherein, based on the rate of change associated with the information within the portion of the second broadcast channel transmission, determining of a second signal measurement is based exclusively on measurements of the cell reference signal.

9. The method of claim 1, wherein the determining the signal measurement comprises:
   decoding a received sequence for the broadcast channel;
   generating the estimated second broadcast channel transmission based on the decoded received sequence; and
   determining a correlation of the estimated second broadcast channel transmission to the received second broadcast channel transmission.

10. The method of claim 9, wherein the decoding comprises:
    determining, based on the indication, a likelihood that a plurality of sequences associated with a plurality of received broadcast channel transmissions has no change for the information within the portion of the second broadcast channel transmission; and
    soft-combining the plurality of received broadcast channel transmissions.

11. The method of claim 9, wherein the determining the signal measurement comprises:
  determining that the correlation of the estimated second broadcast channel transmission to the received second broadcast channel transmission is below a threshold; and
  determining, based on the determining that the correlation is below the threshold, the signal measurement based exclusively on measurements of the cell reference signal.

12. The method of claim 1, wherein the communicating with the cell comprises:
  performing cell reselection to the cell based on the signal measurement.

13. The method of claim 1, wherein the communicating with the cell comprises:
  transmitting an uplink transmission, wherein an uplink power for the uplink transmission is based on the signal measurement.

14. The method of claim 1, wherein the communicating with the cell comprises:
  reporting channel quality to a base station, wherein the reported channel quality is based on the signal measurement.

15. The method of claim 1, wherein the portion of the second broadcast channel transmission comprises a reserved field of the broadcast channel.

16. The method of claim 1, wherein the broadcast channel comprises a physical broadcast channel (PBCH).

17. A method for wireless communication, comprising:
  determining a rate of change of information within a portion of a first broadcast channel transmission associated with a cell;
  transmitting a cell reference signal associated with the cell, the first broadcast channel transmission, and an indication of the rate of change, wherein the rate of change is associated with information within the portion of the first broadcast channel transmission;
  transmitting a second broadcast channel transmission associated with the cell;
  receiving a channel quality report for the cell from a user equipment (UE), wherein the channel quality report is based on a combination of the cell reference signal associated with the cell, an estimate of the second broadcast channel transmission by the UE, and the transmitted second broadcast channel transmission, wherein the estimate of the second broadcast channel transmission is based on the indication and one or more fields of the first broadcast channel transmission; and
  communicating with the UE based on the channel quality report.

18. The method of claim 17, wherein the indication comprises a plurality of indicators and the portion of the first broadcast channel transmission comprises a plurality of fields, and wherein each of the plurality of indicators is associated with one or more of the plurality of fields.

19. The method of claim 17, wherein the transmitting the indication comprises transmitting the indication over the first broadcast channel transmission of the cell, a control channel of the cell, or a configuration message for the cell.

20. The method of claim 17, further comprising:
  transmitting a second indication of a second rate of change of information within a second portion of a third broadcast channel transmission of a second cell, the transmitting the second indication being over a broadcast channel of the second cell, a fourth broadcast channel transmission of the cell, a control channel of the cell, or a configuration message.

21. The method of claim 17, wherein the indication indicates one of a first change periodicity associated with the rate of change associated with the information within the portion of the first broadcast channel transmission not satisfying a condition and a second change periodicity associated with the rate of change associated with the information within the portion of the first broadcast channel transmission satisfying the condition.

22. The method of claim 17, wherein the communicating comprises:
  receiving a random access message from the UE, wherein the UE performs cell reselection to the cell based on a measurement of the first broadcast channel transmission, and wherein the measurement of the first broadcast channel transmission is based on the indication.

23. The method of claim 17, wherein the communicating comprises:
  receiving an uplink transmission, wherein an uplink power for the uplink transmission is based on a measurement of the first broadcast channel transmission, and wherein the measurement of the first broadcast channel transmission is based on the indication.

24. The method of claim 17, wherein the communicating comprises:
  receiving a channel quality indicator from the UE, wherein the channel quality indicator is based on a measurement of the first broadcast channel transmission, and wherein the measurement of the first broadcast channel transmission is based on the indication.

25. The method of claim 17, wherein the cell serves a first set of UEs for which the portion of the first broadcast channel transmission is reserved and a second set of UEs for which the portion of the first broadcast channel transmission comprises at least one or more fields comprising information for the cell.

26. An apparatus for wireless communication, comprising: a processor, memory in electronic communication with the processor; and instructions stored in the memory and executable by the processor to cause the apparatus to:
  receive a first broadcast channel transmission of a plurality of broadcast channel transmissions via a broadcast channel associated with a cell;
  decode one or more fields associated with the first broadcast channel transmission;
  receive an indication of a rate of change, wherein the rate of change is associated with information within a portion of the plurality of broadcast channel transmissions;
  determine an estimate of a second broadcast channel transmission of the plurality of broadcast channel transmissions based on the indication and the decoded one or more fields of the first broadcast channel transmission;
  receive the second broadcast channel transmission via the broadcast channel associated with the cell;
  determine a signal measurement for the cell based on a combination of a cell reference signal associated with the cell, the estimated second broadcast channel transmission, and the received second broadcast channel transmission; and
  communicate with the cell based on the signal measurement.

27. The apparatus of claim 26, wherein the instructions to determine the signal measurement are executable by the processor to cause the apparatus to:

decode a first received sequence for the broadcast channel;

generate a plurality of estimated broadcast channel transmissions for the broadcast channel based on the indication and the decoded first received sequence; and correlate the plurality of estimated broadcast channel transmissions to the received second broadcast channel transmission.

28. The apparatus of claim 26, wherein the instructions to receive the indication are executable by the processor to cause the apparatus to receive the indication over the broadcast channel of the cell, a second broadcast channel of the cell, a control channel of the cell, a configuration message for the cell, a third broadcast channel of a second cell, a control channel of the second cell, or a configuration message for the second cell.

29. An apparatus for wireless communication, comprising: a processor, memory in electronic communication with the processor; and instructions stored in the memory and executable by the processor to cause the apparatus to:

determine a rate of change of information within a portion of a first broadcast channel transmission associated with a cell;

transmit a cell reference signal associated with the cell, the first broadcast channel transmission, and an indication of the rate of change, wherein the rate of change is associated with information within the portion of the first broadcast channel transmission;

transmit a second broadcast channel transmission associated with the cell;

receive a channel quality report for the cell from a user equipment (UE), wherein the channel quality report is based on a combination of the cell reference signal associated with the cell, an estimate of the second broadcast channel transmission by the UE, and the transmitted second broadcast channel transmission, wherein the estimate of the second broadcast channel transmission is based on the indication and one or more fields of the first broadcast channel transmission; and communicate with the UE based on the channel quality report.

30. The apparatus of claim 29, wherein the indication comprises a plurality of indicators and the portion of the first broadcast channel transmission comprises a plurality of fields, and wherein each of the plurality of indicators is associated with one or more of the plurality of fields.

* * * * *